(12) United States Patent
Mitsume et al.

(10) Patent No.: US 6,556,559 B1
(45) Date of Patent: Apr. 29, 2003

(54) AMBIENT FIELD LEVEL MONITOR DEVICE FOR RADIO MOBILE TERMINAL

(75) Inventors: Hiroyuki Mitsume, Kawasaki (JP); Hiroki Takahashi, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/401,926

(22) Filed: Sep. 23, 1999

(30) Foreign Application Priority Data

Nov. 10, 1998 (JP) .......................................... 10-319642

(51) Int. Cl.$^7$ ................................................ H04L 7/00
(52) U.S. Cl. ...................... 370/350; 370/493; 370/337; 455/266.2; 455/250.1
(58) Field of Search .......................... 455/266.2, 250.1, 455/249.1, 115–116, 126–127, 484, 561, 232.1, 234.1, 234.2, 245.1, 226.1, 226.2; 370/493, 337, 347, 336, 395, 300, 324, 516, 517, 519; 375/355, 356

(56) References Cited

U.S. PATENT DOCUMENTS

| | | | |
|---|---|---|---|
| 4,404,672 A | * 9/1983 | Shimizu | 370/294 |
| 5,912,886 A | * 6/1999 | Takahashi et al. | 370/350 |
| 5,960,335 A | * 9/1999 | Umemoto et al. | 455/226.2 |
| 5,974,040 A | * 10/1999 | Kimura | 370/337 |
| 6,201,802 B1 | * 3/2001 | Dean | 370/350 |
| 6,219,528 B1 | * 4/2001 | Wright et al. | 455/13.4 |

FOREIGN PATENT DOCUMENTS

| | | |
|---|---|---|
| JP | 7-202827 | 8/1995 |
| JP | 7-240697 | 9/1995 |

* cited by examiner

Primary Examiner—Thanh Cong Le
Assistant Examiner—Pablo N Tran
(74) Attorney, Agent, or Firm—Katten Muchin Zavis Rosenman

(57) ABSTRACT

The present invention relates to an ambient field level monitor device for a radio mobile terminal, comprising a reception unit for receiving a radio signal arriving at the radio mobile terminal to output a reception signal originating from the received radio signal and further to output an ambient field level signal, a synchronization decision section for receiving the reception signal from the reception unit to judge whether or not the reception unit is in synchronism with the received radio signal, and a time constant variable type ambient field level monitoring unit for receiving the ambient field level signal from the reception unit. If the synchronization decision section judges that the reception unit is out of synchronism with the received radio signal, the ambient field level monitoring unit increases its time constant so that the time constant exceeds its time constant to be taken for when the synchronization decision section judges that the reception unit is in synchronism with the received radio signal and if the synchronization decision section judges that the reception unit is synchronism with the radio signal, the ambient field level monitoring unit decreases the time constant. This reduces the measurement error caused by the difference between sampling timings, thereby enabling stable RSSI value detection irrespective of a phase synchronization condition of a mobile station to improve the detection accuracy.

5 Claims, 20 Drawing Sheets

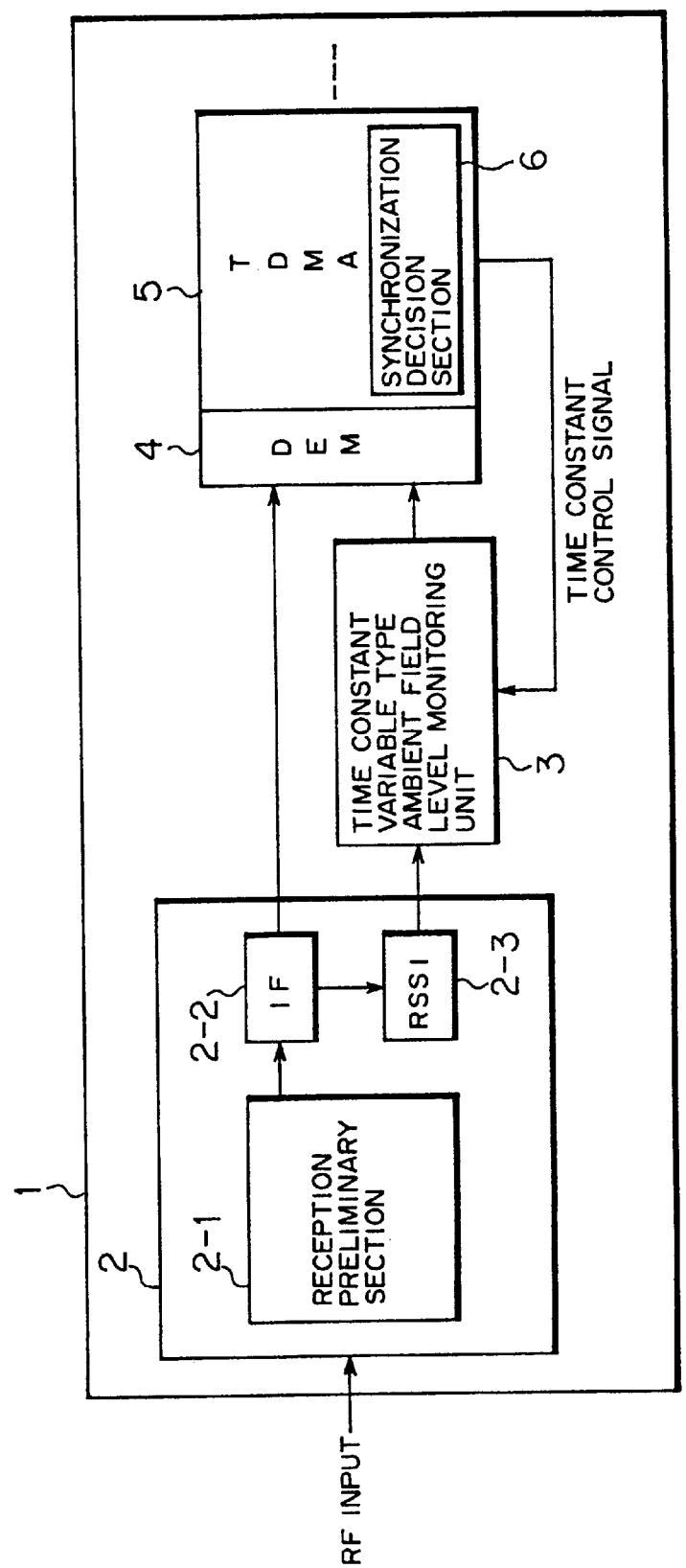

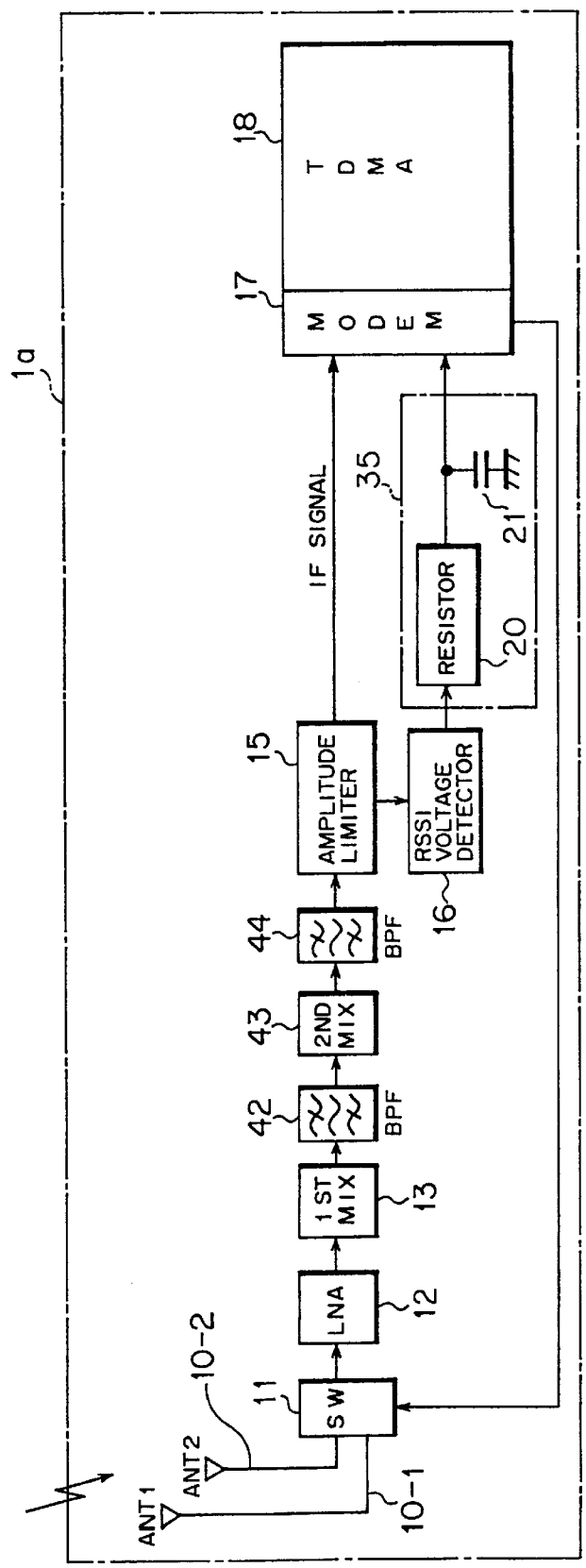

100 pF GIVEN

VARIATION CORRESPONDING TO 1.3 dB 50 dBµ RECEPTION
1/4π QPSK "ALL 1" MODULATION 100 pF GIVEN

VARIATION CORRESPONDING TO 5.3 dB

BASE STATION DISPOSITION

R: RECEPTION SLOT (MAKE RECEPTION)
I: IDLE SLOT (MONITOR AMBIENT FIELD LEVEL)
T: TRANSMISSION SLOT (MAKE TRANSMISSION)
LM: CONTROL SLOT (MAKE CONTROL)

AMBIENT FIELD LEVEL MONITOR DEVICE FOR RADIO MOBILE TERMINAL

BACKGROUND OF THE INVENTION

1) Field of the Invention

The present invention relates to an ambient field level monitor device applicable suitably for a radio mobile terminal or station.

2) Description of the Related Art

In the recent years, with an explosive increase of portable telephone subscribers, communication enterprises installs a large number of base stations and increase the number of channels to be put to use, thereby attempting to stabilize communications.

Viewing a channel detection method taken in a Japanese PDC (Personal Digital Cellular) system, a radio mobile terminal, forming a mobile station, detects the level of a carrier from a base station within a peripheral cell during an idle slot time to measure a value of its received signal strength intensity (which will be referred hereinafter to as an RSSI), and reports the measurements to the base station, while the base station receives that report successively. During communications with the mobile station, if a-peripheral cell exists which shows a received level higher than that of the current cell by a given value or more, the base station refers to a base station in that peripheral cell for the presence or absence of a free channel and, if the free channel is present, transmits channel information to the mobile station (which will sometimes be referred hereinafter to as mobile equipment). Thus, the mobile station comes to use that channel.

This RSSI value detection method is made to obtain an intermediate frequency signal down-converted from a radio frequency signal. That is, while the intermediate frequency signal is inputted to a limiter to undergo amplitude limiting processing, a signal is taken out from a predetermined portion of that limiter and then processed in another circuit, thereby obtaining the RSSI value. The limiter is composed of a plurality of logarithmic amplifiers or the like cascaded, and the intermediate frequency signal taken out from the predetermined portion is smoothed through a low-pass filter in another circuit to detect a DC level so that the detection value is outputted as an RSSI value.

FIG. 18 is an illustration of a cell disposition in the Japanese PDC system and shows a base station disposition. Circles forming cells A to F represent schematic zones the base stations can cover respectively. In FIG. 18, in case where a mobile station 60 first stays in the zone D and then moves into the zone B, the mobile station 60 has used a channel pertaining to the zone D at first, and then gradually approaches the zones C and F and finally reaches the zone B. In this instance, in order to ensure stable communications under such an environment, there is a need for the mobile station 60 to certainly capture, of a plurality of receivable carriers from the base stations, a channel showing the highest RSSI value as occasion calls. Thus, the mobile station 60 is required to make measurements of the RSSI values in the peripheral zones with high accuracy during a period of time for an idle slot.

This idle slot is one of TDMA slots, while FIG. 19 is an illustration of a TDMA slot configuration on the mobile station 60 side. In FIG. 19, the mobile station 60 side TDMA slot is made up of four types of slots: a reception slot R, an idle slot I, a transmission slot T and a control slot LM. The mobile station 60 conducts the reception through the reception slot R and receives carriers from a plurality of other base stations through the idle slot I to sense the presence or absence of a free channel the mobile station 60 itself can transmit (carrier sense), while performing the transmission through the transmission slot T and measuring a level for the antenna switching diversity control through the control slot LM. As one of the countermeasures against the fading, the mobile station 60 employs the antenna diversity for switching between usually two receiving antennas to receive a signal from one of the two antennas which exhibits the best receiving condition. That is, during this LM time period, the mobile station 60 measures the RSSI level through each of the two antennas to select one antenna indicating a higher level.

For conducting the carrier sense during the slot I time period, the mobile station 60 switches among the channels by altering the frequency value of a PLL (Phase Locked Loop; referred to as a PLL) frequency synthesizer, thereby measuring the RSSI value at every channel. Meanwhile, when the mobile station 60 makes the measurement of the RSSI value, owing to the influence of the two facts: ①the received level variation caused by the fading and ②the RSSI value sampling error occurring because the level detection is made in a non-synchronous (asynchronous) condition, the measurement result becomes unstable and its accuracy drops. The variation due to the fading stems from the fact that the received level varies momently depending on the situation of the transmission path. Further, the RSSI value sampling error originates from the fact that the amplitude of the reception signal varies at all times. With reference to FIG. 20, a description will be given hereinbelow of this error.

FIG. 20 is an illustration of an RSSI detection voltage waveform appearing at the application of a capacitance value of 100 pF. This waveform obtained by giving a capacitance value of 100 pF, shows the case where an "all-1" modulated wave is received, where a peak appears at an interval of symbol clock time (the inverse number of 21 kHz) along a time base and its amplitude varies at all times. Further, if the sampling is made to obtain RSSI value at the sampling timings t1, t2 and t3 indicated in FIG. 20, a variation of the measured level depending upon the sampling timings is large so that the RSSI value detected contains errors and becomes unstable. Accordingly, the operation of the mobile station 60 itself also becomes unstable by conducting the channel switching operation on the basis of the information on the RSSI value in a peripheral zone.

A factor to vary the signal amplitude at all times is that the transmission is made through a Nyquist filter on the transmission side. That is, the base station imposes limitation in band on a transmitting signal through the use of the Nyquist filter to eliminate the interference between codes in a receiver. Thus, at the transmission filter output in a transmitter, filter responses with symbol waveforms, each generated at every symbol, overlap with each other so that the signal amplitude of the Nyquist filter output becomes constant at the symbol point, whereas the amplitude goes high or low at the other points. For this reason, the locus of the modulated signal on a phase plane lies on a unit circle at the symbol point, but shifts from the unit circle at the other points. The shifting from this unit circle will be described hereinbelow with reference to FIGS. 21A to 21C.

FIG. 21A is an illustration of a disposition of reception signal symbol points on the receive side. In FIG. 21A, an amplitude locus connecting four symbol points 61a, 61b, 61c and 61d shifts outwardly or inwardly from a unit circle because of the effect of the interposition of a route Nyquist filter on the transmission side. Further, FIG. 21B is an illustration of an RSSI amplitude detection values at points in a phase synchronous condition (phase synchronized condition) In FIG. 21B, since the detection timings (corresponding to arrows from the origin) coincide with the aforesaid four symbol points 61a, 61b, 61c and 61d, the detection amplitudes are constant between each detection point of the RSSI value. On the other hand, FIG. 21C is an illustration of an RSSI amplitude detection values at points in a phase non-synchronous condition (not phase synchronized condition), where the detection amplitude of the RSSI value varies in accordance with the measurement timing because the detection timings (corresponding to arrows from the origin) shift from the symbol points.

Therefore, so far, a capacitor with a large capacitance has been added to an RSSI detection circuit. In this case, the time constant of its low-pass filter increases to cause the smoothing time of the low-pass filter to be prolonged, and the integration of the amplitude variation due to the shifting of the RSSI detection timing reduces the measurement error.

Japanese Patent Laid-Open (Kokai) No. HEI7-240697 (which will be referred hereinafter to as a publication 1) discloses a technique for switching the time constant within a PLL frequency synthesizer circuit.

This publication 1 discloses a technique relating to a frequency synthesizer circuit, without enlarging the scale of a circuit, capable of stabilizing the transmission/reception performance in a digital mobile communication system or the like. This technique produces a variation of the gain of a loop filter in the PLL frequency synthesizer circuit in order to satisfy the requirements for a high-speed response performance with respect to a carrier for the carrier sense and for a high C/N ratio with respect to a carrier for the reception.

Concretely, according to the technique disclosed in this publication 1, the time constant of a time constant circuit in the PLL frequency synthesizer circuit is altered in accordance with the response times required individually for the communication slots so that a voltage control oscillating means is controllable. Thus, without providing a PLL frequency synthesizer circuit for each of the communication slots, the supply of an oscillating frequency signal with a stable and sufficient C/N ratio to a transmission/reception circuit becomes feasible, thereby enabling the significant improvement of the transmission/reception performance of the digital mobile communication system or the like.

More concretely, during the slot I time period, for the purpose of quick carrier sense, even if sacrificing the C/N ratio somewhat, the high-speed response performance is preferentially secured so that the rising of the voltage waveform in the output of the voltage control oscillator becomes quickened. In addition, for quickening this rising, control is implemented to decrease the time constant of the tuning voltage to be inputted to the voltage control oscillator.

Moreover, Japanese Patent Laid-Open (Kokai) No. HEI7-202827 (which will be referred hereinafter to as a publication 2) discloses an approach to improve the accuracy of the RSSI detection value in a phase synchronous condition.

This publication 2 discloses the following technique concerning a received level detection circuit to be employed for a digital wireless terminal based on the time-division multiplexing. That is, according to this technique, a reception signal composed of a burst waveform in the digital wireless terminal is led to two low-pass filters different in time constant from each other, and in synchronism with a timing of the burst waveform of the reception signal, the reception level output from the low-pass filter with a higher time constant is selected for the burst time period while the reception level output from the low-pass filter with a lower time constant is selected for a time period other than the burst time period, with the result that the detection level at a detection point within the burst time period is securable with high accuracy and the detection level at a detection point within the time period other than the burst time period is also securable with high accuracy.

However, the above-mentioned publication 1 does not disclose a technique for improving the accuracy of the detection of the RSSI value. Further, the technique disclosed in the above-mentioned publication 2 involves switching the low-pass filters in synchronism with a timing of a burst waveform, but not teaching a technique to be taken in the asynchronous condition with that timing.

In addition, in the case of the technique in which a capacitor with a large capacitance is incorporated into the RSSI detection circuit as mentioned above, increasing the constant of a capacitor to be incorporated into the RSSI detection circuit causes an increase in the time constant of the low-pass filter, which interferes with the RSSI measurements to be made by two antennas during the control slot LM time period to produce the drawbacks such as a diversity malfunction, an decrease in the diversity gain and a decrease in the RSSI detection value. For this reason, there is a limit to the time constant to be set by the incorporation of the capacitor or the like.

SUMMARY OF THE INVENTION

Accordingly, the present invention has been developed with a view to eliminating these problems, and it is therefore an object of this invention to provide an ambient field level monitor device for a radio mobile terminal which is made to, when being out of synchronism with a phase of a received radio signal, switch an RSSI time constant to a value greater than an RSSI time constant to be taken in a synchronous condition with the phase of the radio signal, thereby lessen the measurement error stemming from the shifting of the RSSI sampling timing, making the RSSI value detection stable and enhancing the detection accuracy.

For this purpose, in accordance with this invention, there is provided an ambient field level monitor device for a radio mobile terminal, comprising a reception section for receiving a radio signal arriving at the radio mobile terminal to output a reception signal originating from the received radio signal and further to output an ambient field level signal, a synchronization decision section for receiving the reception signal from the reception section to judge whether or not the reception section is in synchronism with the radio signal, and a time constant variable type ambient field level monitoring section for receiving the ambient field level signal from the reception section, wherein, if the synchronization decision section judges that the reception section is out of synchronism with the radio signal, the ambient field level monitoring section increases its own time constant to exceed its own time constant to be taken for when the synchronization decision section judges that the reception section is in synchronism with the radio signal and if it judges that the reception section is synchronism with the radio signal, the ambient field level monitoring section decreases the time constant.

Thus, without exerting influence on the RSSI measurement in a synchronous condition, the reduction of the RSSI level measurement error becomes feasible in a non-synchronous condition. Whereupon, a proper zone selection is allowed to the radio mobile terminal to prevent the interruption of communications. Additionally, since there is no need to increase the time constant value in a synchronous condition with the radio signal, it is possible to eliminate the problems such as the diversity malfunction and the diversity gain reduction, and further to remove the troubles such as a decrease in the detected RSSI value.

Furthermore, in this case, it is also appropriate that the time constant variable type ambient field level monitoring section is constructed by a combination of a capacitor and a resistor, and constructed in the form of an analog integrating circuit in which any one of the capacitor and the resistor is made such that its impedance value is variable, or that the time constant variable type ambient field level monitoring section is made up of an analog/digital converter for performing an analog-to-digital conversion of the ambient field level signal forming an analog signal from the reception section, a digital integrating circuit for integrating a digital signal from the analog/digital converter, with the digital integrating circuit being made such that its integrating state is variable, and a digital/analog converter for conducting a digital-to-analog conversion of the digital signal from the digital integrating circuit.

In this way, similarly, without affecting the RSSI measurement in a synchronous condition, it is possible to lessen the RSSI level measurement error of a peripheral zone in a non-synchronous condition.

Still further, it is also acceptable that the ambient field level monitoring section is made to switch its time constant or digital sampling data extracting interval or mode for a predetermined period of time from receiving a channel switching signal through the use of the channel switching signal.

Similarly, stable and high-accuracy RSSI measurement becomes feasible in this way.

Moreover, in accordance with this invention, there is provided an ambient field level monitor device for a radio mobile terminal, comprising a reception section for receiving a radio signal arriving at the radio mobile terminal to output a reception signal originating from the radio signal and further to output an ambient field level signal, a synchronization decision section for receiving the reception signal from the reception section to judge whether or not the reception section is in synchronism with the radio signal, and an ambient field level monitoring section for receiving the ambient field level signal from the reception section and for extracting a digital sampling data from the ambient field level signal to detect an ambient field level, wherein, for the detection of the ambient field level, the ambient field level monitoring section selectively employs different modes for the extraction of the digital sampling data from the ambient field level signal for when the synchronization decision section judges that the reception section is out of synchronism with the radio signal and for when it judges that the reception section is in synchronism with the radio signal.

Thus, without exerting influence on the RSSI measurement in a synchronous condition, the reduction of the RSSI level measurement error becomes feasible in an asynchronous condition, and a proper zone selection is allowed to the radio mobile terminal to prevent the interruption of communications. Additionally, it is possible to eliminate the problems such as a diversity malfunction and a diversity gain reduction, in a synchronous condition with the radio signal, and further to prevent the troubles such as a decrease in the RSSI detection value.

In addition, it is also appropriate that the ambient field level monitoring section extracts digital sampling data at a data varying point of the ambient field level signal when the synchronization decision section judges that the reception section is out of synchronism with the radio signal, or that the ambient field level monitoring section extracts high-speed digital sampling data from the ambient field level signal when the synchronization decision section judges that the reception section is out of synchronism with the radio signal.

In this way, it is possible to detect a precise RSSI value hardly containing errors, and further to stable make the RSSI measurement with high accuracy. Additionally, without affecting the RSSI measurement in a synchronous condition, it is possible to reduce the error in the RSSI level measurement of a peripheral zone in an asynchronous condition.

Besides, it is also acceptable that the ambient field level monitoring section changes its time constant or digital sampling data extraction interval or mode for a predetermined period of time from receiving a channel switching signal through the use of a channel switching signal. Similarly, this enables the stable and high-accuracy RSSI measurement.

BRIEF DESCRIPTION OF THE DRAWINGS

FIG. 1 is a functional block diagram showing an ambient field level monitor device according to a first embodiment of the present invention;

FIG. 4A is a block diagram showing another configuration of the ambient field level monitor device according to the first embodiment of this invention;

FIG. 4B is an illustration of a TDMA slot configuration on a mobile equipment side;

DESCRIPTION OF THE PREFERRED EMBODIMENTS

Figure 2A:
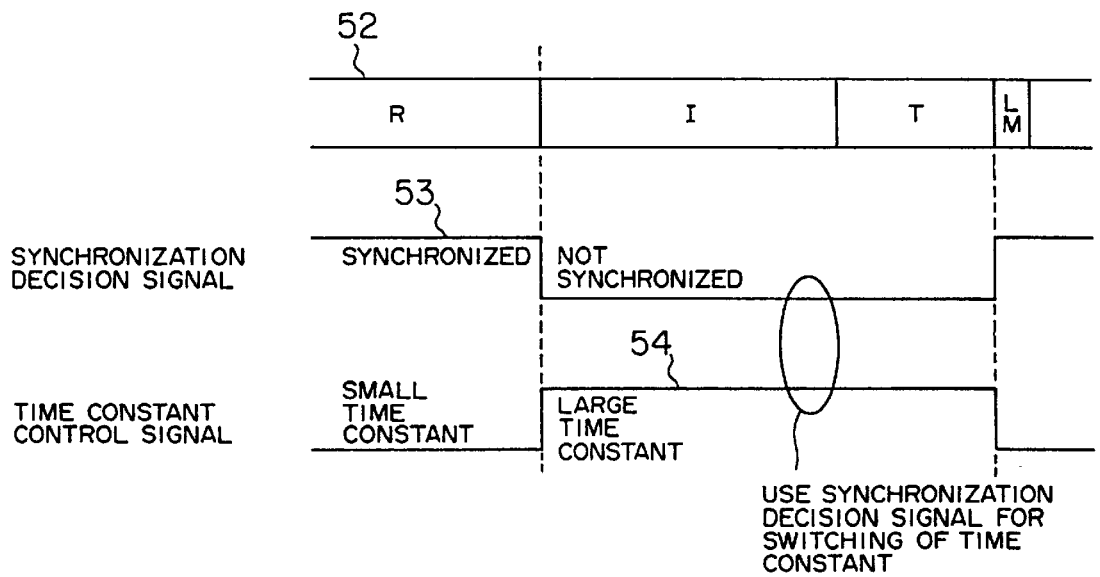
FIG. 2A is a timing chart useful for describing the switching of a time constant control signal by a synchronisation decision signal to be outputted from a synchronization decision section.

Referring to the drawings, a description will be is made hereinbelow of embodiments of the present invention.

(A)Description of First Embodiment of this Invention

FIG. 1 is a functional block diagram showing an ambient field level monitor device according to a first embodiment of this invention. In FIG. 1, an ambient field level monitor device, designated generally at numeral 1, is applicable to a radio mobile terminal and is made to detect the magnitude of a carrier level from a base station within a peripheral cell. The carrier level detected is transmitted as information, needed for the radio mobile terminal to shift into another cell, to a base station being currently on the communication. That is, in a Japanese PDC system, during an idle slot time period, a radio mobile terminal (mobile station) measures its received signal strength intensity (RSSI) value of the ambient cell and transmits it to a base station, while the base station performs the allocation of a channel of a mobile terminal (which will sometimes to be referred hereinafter to as a mobile equipment), on the basis of the measurement result. A description will be given hereinbelow of a radio mobile terminal forming a mobile station in a Japanese PDC system. The ambient field level monitor device 1, shown in FIG. 1, is made up of a reception unit 2, a time constant variable type ambient field level monitoring unit 3, a demodulating unit (DEM) 4 and a TDMA control unit (TDMA) 5.

The reception unit 2 receives a radio signal while outputting a reception signal originating from the received radio signal and further outputting an ambient field level signal, and includes a reception preliminary section 2-1, an intermediate frequency signal outputting section (IF) 2-2 and an RSSI signal outputting section (RSSI) 2-3. The reception preliminary section 2-1 receives a radio signal coming through a radio propagation path for outputting an intermediate frequency signal (IF signal) after its frequency conversion and band filtering. The intermediate frequency signal outputting section 2-2 limits an amplitude of an intermediate frequency signal from the reception preliminary section 2-1 and this amplitude-limited intermediate frequency signal is a signal originating from the radio signal. The RSSI signal outputting section 2-3 derives a signal from a predetermined portion of the intermediate frequency signal outputting section 2-2 to output a pulsating voltage signal as an ambient field level signal.

The time constant variable type ambient field level monitoring unit 3 receives the ambient field level signal from the reception unit 2 (concretely, the RSSI signal outputting section 2-3), and includes a low-pass filter or the like, so that its time constant is variable by a time constant control signal from the external.

The demodulating unit 4 is for demodulating the intermediate frequency signal from the reception unit 2 (concretely, the intermediate frequency signal outputting section 2-2), while the TDMA control unit 5 is for monitoring the transmission/reception slot timings and further for judging, on the basis of a demodulated signal from the demodulating unit 4, whether the reception unit 2 or the like is in a synchronous condition or in a non-synchronous (asynchronous) condition. This TDMA control unit 5 includes a synchronization decision section 6.

The synchronization decision section 6 is for receiving the reception signal from the reception unit 2 to judge whether or not the reception unit 2 is in synchronism with the received radio signal. And if the synchronization decision section 6 judges that the reception unit 2 is out of synchronism with the received radio signal, the time constant variable type ambient field level monitoring unit 3 increases its time constant so that the time constant exceeds Its time constant to be taken for when the synchronization decision section 6 judges that the reception unit 2 is in synchronism with the received radio signal and if it is in synchronism with the received radio signal, the ambient field level monitoring unit 3 decreases the time constant. The TDMA control unit 5 and the synchronization decision section 6 always monitor whether or not the reception unit 2 is in synchronism with the inputted radio signal.

FIG. 2A is a timing chart useful for describing the switching of the time constant control signal on the basis of a synchronism decision signal outputted from the synchronization decision section 6. In FIG. 2A, a time slot 52 signifies a transmission/reception timing on the mobile equipment side, wherein an R slot represents a period of time for which this radio mobile terminal receives a reception signal from a base station, while an I slot denotes a period of time for which the ambient field level monitor device 1 conducts the carrier sense with respect to an ambient field carrier and is put to use for receiving radio signals from a plurality of other base stations to detect the presence or absence of a free channel this equipment can employ. Further, a T slot means a period of time for which this radio mobile terminal performs a transmission to the base station, while an LM slot depicts a period of time for which a level is measured for antenna switching diversity control whereby the switching between usually two reception antennas is made so that a reception signal is obtainable from the antenna which shows the best reception condition.

In addition, in FIG. 2A, a time constant control signal 54 is to be outputted from the synchronization decision section 6 to the time constant variable type ambient field level monitoring unit 3, and when a synchronization decision signal 53 indicates the synchronous condition, the time constant of the time constant variable type ambient field level monitoring unit 3 is set to a small value as shown in this illustration. Further, as mentioned above, when being out of synchronism with a radio signal, the time constant value thereof is set to be larger than that taken for when being in the synchronous condition with the radio signal, where an RSSI detection voltage is taken for measurement. Still further, if the synchronous condition is taken again, the time constant control signal 54 is set to decrease the time constant thereof. In this way, the ambient field level monitor device 1 is designed such that the time constant thereof is set in accordance with the synchronism decision result (synchronism determination result) by the synchronization decision section 6.

Furthermore, in the ambient field level monitor device 1, the time constant variable type ambient field level monitoring unit 3 is made to set different time constant values in the synchronous condition with is the radio signal and in the non-synchronous condition therewith so that there is no need to set this time constant to a large value at the synchronism with the radio signal, which eliminates the troubles such as a diversity malfunction and a decrease in the diversity gain and further prevents a decrease in the RSSI detection value. Additionally, since the time constant in the ambient field level monitor device 1 is set to a large value in an asynchronous condition, it is possible to reduce the RSSI measurement error in the asynchronous condition.

Accordingly, the reception processing is as follows. A radio signal transmitted from a base station (not shown) advances through a radio propagation path to enter the reception unit 2 of this ambient field level monitor device 1, where the reception preliminary section 2-1 performs a frequency conversion of this radio signal to output it in the form of an intermediate frequency signal having a desired frequency value. Further, in the intermediate frequency signal outputting section 2-2, the amplitude of the intermediate frequency signal is limited before outputting it, and the RSSI signal outputting section 2-3 detects the reception level from the same intermediate frequency signal and outputs a direct-current voltage as an ambient field level signal to the time constant variable type ambient field level monitoring unit 3. Still further, the demodulating unit 4 demodulates the intermediate frequency signal from the intermediate frequency signal outputting section 2-2, while the time constant variable type ambient field level monitoring unit 3 derives an RSSI voltage signal from the aforesaid direct-current voltage and outputs it to the demodulating unit 4 which in turn, reads the RSSI voltage signal to detect an RSSI value from this RSSI voltage signal value for monitoring the ambient field level. Moreover, the TDMA control unit 5 makes demodulated signal from the intermediate frequency signal and the RSSI detection voltage signal coincide in timing with each other and outputs them to the following stage. At this time, if the synchronization decision section 6 of the TDMA control unit 5 judges the asynchronous condition with the inputted radio signal, the time constant of the time constant variable type ambient field level monitoring unit 3 is increased to be larger than the time constant thereof to be taken for when the synchronization decision section 6 judges the synchronous condition therewith.

Thereafter, for example, in the case of a radio portable telephone, although not shown, a reception signal demodulated passes through a voice circuit or the like to enter the ears of the user through a speaker, while an antenna mark or the like depending is on the read RSSI value appears on a display. Besides, in the transmission processing, although not shown, the data to be transmitted is modulated in a modulator and then converted in frequency to be sent as a radio signal. A detailed description of this transmission processing will be omitted hereinbelow for brevity.

Figure 3:
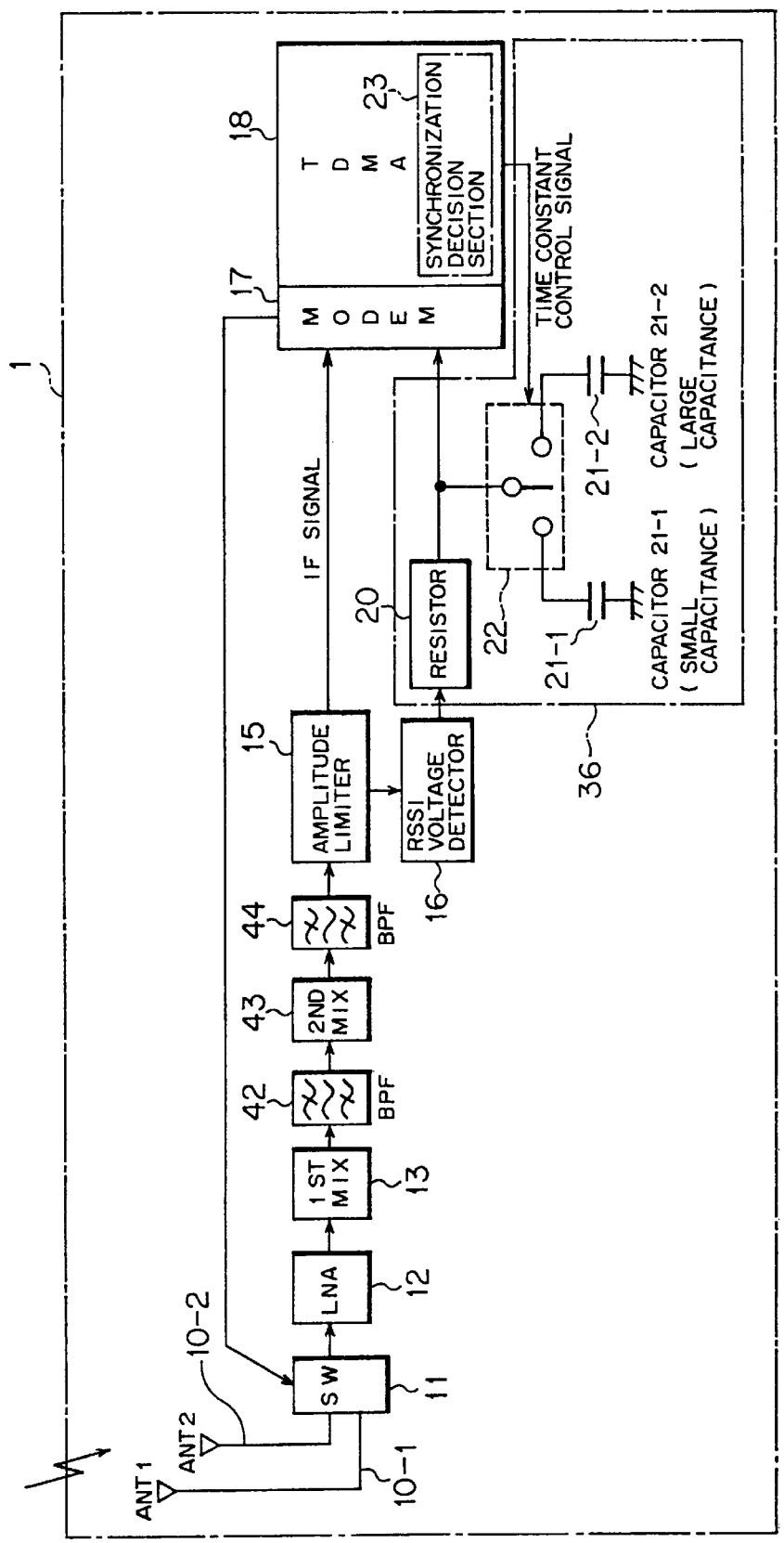
FIG. 3 is a block diagram showing the ambient field level monitor device according to the first embodiment of this invention.

FIG. 3 is a block diagram showing an ambient field level monitor device 1 according to a first embodiment of this invention, showing a more detailed configuration of the above-described ambient field level monitor device 1. The ambient field level monitor device 1 shown in FIG. 3 is composed of reception antennas 10-1, 10-2, an antenna switching unit (SW) 11, an amplifier (LNA) 12, a first frequency converter (1ST MIX) 13, a first intermediate frequency filter (BPF) 42, a second frequency converter (2ND MIX) 43, a second intermediate frequency filter (BPF) 44, an amplitude limiter 15, an RSSI voltage detector 16, a modulator/demodulator (MODEM) 17, a TDMA control unit 18 and an ambient field level monitoring unit 36.

In this instance, a combination of the reception antennas 10-1, 10-2, the antenna switching unit 11, the amplifier 12, the first frequency converter 13, the first intermediate frequency filter 42, the second frequency converter 43 and the second intermediate frequency filter 44 corresponds to the aforesaid reception preliminary section 2-1. Further, the amplitude limiter 15 corresponds to the aforesaid intermediate frequency signal outputting section 2-2, the RSSI voltage detector 16 corresponds to the aforesaid RSSI signal outputting section 2-3. Still further, the modulator/demodulator 17 and the TDMA control unit 18 correspond to the aforesaid demodulating unit 4 and the aforesaid TDMA control unit 5, respectively, while the ambient field level monitoring unit 36 corresponds to the aforesaid time constant variable type ambient field level monitoring unit 3.

Each of the reception antennas 10-1, 10-2 forms a diversity antenna for receiving a radio signal, while the antenna switching unit 11 is for taking a signal through any one of the reception antennas 10-1, 10-2, and is composed of an antenna switch or the like. These two reception antennas 10-1, 10-2 are installed on a ratio mobile terminal in a state of being separated spatially and a signal from the one showing a larger received signal strength intensity is selected and received.

The amplifier 12 is for amplifying the radio signal outputted from the antenna switching unit 11 with a low noise, with an LNA (Low Noise Amplifier) or the like being used therefor. Further, the first frequency converter 13 is for down-converting a frequency of the radio signal outputted from this amplifier 12 to output an intermediate frequency signal having a desired frequency, and is made up of a mixer, an oscillator or the like. The first intermediate frequency filter 42 allows the transmission of only the intermediate frequency signal outputted from the first frequency converter 13, and is composed of a band-pass filter. The second frequency converter 43 is for converting the intermediate frequency signal outputted from the first intermediate frequency filter 42 into a desired second intermediate frequency signal, and is composed of a mixer, an oscillator or the like. The second intermediate frequency filter 44 permits the transmission of only the desired second intermediate frequency signal outputted from the second frequency converter 43, and comprises a band-pass filter. With these units, the radio mobile terminal receives a radio signal from a base station through a radio propagation path and outputs an intermediate frequency signal after the frequency conversion and the band filtering.

Furthermore, the amplitude limiter 15 is for amplitude-limiting the intermediate frequency signal outputted from the second intermediate frequency filter 44 to output an intermediate frequency signal originating from the radio signal. This function relies upon an amplification circuit (not shown) comprising a multi-stage operational amplifiers cascaded, with the intermediate frequency signal inputted from the second intermediate frequency filter 44 being amplitude-amplified up to saturation before being outputted.

The RSSI voltage detector 16 is for taking out an intermediate frequency signal from a predetermined portion in the amplitude limiter 15 to output an ambient field level signal, and is composed of an RC filter or the like. The intermediate frequency signal from the predetermined portion of an amplifying circuit (not shown) in the amplitude limiter 15 is subjected to predetermined processing to be converted into a pulsating current including ripples and then outputted as the ambient field level signal to the following ambient field level monitoring unit 36.

The ambient field level monitoring unit 36 is for removing a harmonic component from a pulsating current waveform signal forming the ambient field level signal from the RSSI voltage detector 16 to output only a direct-current component to the following modulator/demodulator 17. In this case, this function relies upon a fixed resistor 20, capacitors 21-1, 21-2 and a switch 22 as shown in FIG. 3. That is, the fixed resistor 20 and the capacitor 21-1 (or the capacitor 21-2) constitute a low-pass filter whereby the harmonic component is removed so that a direct-current signal is outputted thereto. The capacitor 21-1 has a small capacitance value while the capacitor 21-2 has a large capacitance value. Further, the switch 22 is for switching the output in accordance with a time constant control signal from the external. That is, one of these capacitors 21-1, 21-2 is chosen in accordance with a high state/low state of the time constant control signal from the external.

Concretely, the capacitor 21-1 is selected in the synchronous condition with the inputted radio signal, whereas the capacitor 21-2 is selected in the asynchronous condition so that the time constant value of this low-pass filter becomes larger than that in the synchronous condition with the radio signal. Incidentally, this ambient field level monitoring unit 36 has a versatile configuration, which will be described in detail herein later.

The modulator/demodulator 17 is for demodulating the output of the aforesaid amplitude limiter 15 and further for sampling the level of the output of the ambient field level monitoring unit 36, and still further for outputting a reception diversity switching control signal to the antenna switching unit 11, and is composed of an IC or the like and equipped with two-system input signal lines. Besides, although this modulator/demodulator 17 has a modulating function, because consideration is not given to the transmission flow, a detailed description thereof will be omitted for simplicity. Further, the signal on the line for one (the upper side in FIG. 3) of the two systems, being a signal line, is demodulated in this modulator/demodulator 17 and outputted to the following stage, whereas the signal on the other line, forming an RSSI voltage line, is read in this modulator/demodulator 17. This RSSI value detecting method can be made such that an analog/digital converter is interposed to accomplish the analog/digital conversion of the RSSI voltage and then its digital value is read by an CPU (not shown), or such that a comparator is provided to sample its analog level directly. Further, this modulator/demodulator 17 is made to output an antenna switching control signal in accordance with the reception state.

The TDMA control unit 18 is for monitoring the transmission/reception slot timings and further for making a decision on synchronism/no synchronism on the basis of the demodulated signal from the modulator/demodulator 17, and even for controlling the timings to prevent any one of the signals on the two systems to be inputted to the modulator/demodulator 17 from advancing or delaying to produce a disagreement therebetween. Accordingly, the TDMA control unit 18 and the modulator/demodulator 17 interchange timing signals with each other. Further, this TDMA control unit 18 is constructed using an IC or the like and is provided with a synchronization decision section 23 for judging whether or not this device 1 is in a synchronous condition with the inputted radio signal.

This synchronization decision section 23 is for, when making a decision that the device 1 is not in a synchronous condition with the inputted radio signal, making the time constant of the ambient field level monitoring unit 36 larger than that to be taken for when making a decision that it is in a synchronous condition therewith. This function is achievable in a manner that a CPU, a ROM, a RAM and others (all not shown) operate cooperatively, or using an IC or the like.

Thus, in the synchronization decision section 23, a synchronization timing is attainable on the basis of a demodulated signal outputted from the modulator/demodulator 17, and the phase timings of the demodulated signal and the RSSI voltage are made to coincide with each other. In this state, the TDMA control unit 18 outputs a timing signal to each portions of the radio mobile terminal. Further, the demodulated signal outputted from the modulator/demodulator 17 and the RSSI voltage signal are made uniform to keep the coincidence in time therebetween, before being outputted to the next stage.

In this way, a radio signal from a base station passes through a radio propagation path to arrive at the reception antennas 10-1, 10-2. Referring to FIGS. 4A and 4B, a description will be given hereinbelow of the antenna diversity method employed for the ambient field level monitor device 1. FIG. 4A is a block diagram showing another configuration of an ambient field level monitor device according to the first embodiment of this invention. The ambient field level monitor device, designated at numeral 1a in FIG. 4A, differs from the above-described ambient field level monitor device 1 in that the capacitance of a capacitor is fixed in its ambient field level monitoring unit. In the ambient field level monitor device 1a, an ambient field level monitoring unit 35 is made up of a fixed resistor 20 and a fixed capacitance capacitor 21. FIG. 4B is an illustration of a TDMA slot configuration on the mobile equipment side. In FIG. 4B, an LM slot time period has a time of approximately 1 ms, and during this time, as one of the countermeasures against the fading, the radio mobile terminal selects one of the reception antennas 10-1, 10-2 which shows a larger received signal strength intensity. In this way, one of the reception antennas 10-1, 10-2 is chosen in accordance with the level of the reception signal. Modifications and embodiments of this invention, which will be described herein later, also employ a similar diversity way.

Returning again to FIG. 3, a radio signal from the antenna switching unit 11 undergoes the frequency conversion in the first frequency converter 13 and the band filtering in the first intermediate frequency filter 42 and further the second frequency conversion in the second frequency converter 43. The resultant output signal undergoes the filtering processing with a desired value in the second intermediate frequency filter 44, thereby producing an output of an intermediate frequency signal. Further, the amplitude limiter 15 limits the amplitude of the intermediate frequency signal outputted from the second intermediate frequency filter 44, with the amplitude-limited intermediate frequency signal being inputted to the modulator/demodulator 17 and also inputted to the RSSI voltage detector 16. The RSSI voltage detector 16 derives the intermediate frequency signal from a predetermined portion within the amplitude limiter 15 and processes it in a predetermined way, thereafter outputting it as an ambient field level signal to the ambient field level monitoring unit 36 which in turn, removes a harmonic component(s) and inputs an RSSI voltage signal in the modulator/demodulator 17. In this modulator/demodulator 17, the intermediate frequency signal from the amplitude limiter 15 is demodulated, is while the direct-current of the RSSI voltage signal from the ambient field level monitoring unit 36 is read. Further, the synchronization decision section 23 monitors the synchronous condition of the demodulated signal from the modulator/demodulator 17. If the synchronization decision section 23 makes a decision that the demodulated signal does not indicate a synchronous condition with the inputted radio signal, the ambient field level monitoring unit 36 makes its own time constant in this case exceed its own time constant to be taken for when making a decision that the demodulated signal indicates a synchronous condition therewith.

With this configuration, at the variation from the synchronous condition to the asynchronous condition, the time constant setting alteration is made. Referring to FIGS. 5A, 5B and FIGS. 6A, 6B, a description will be made hereinbelow of detection voltage waveforms in this instance.

First of all, in the case of the synchronous condition with the inputted radio signal [synchronization acquisition condition (this expression will sometimes be used in order to distinguish the synchronous condition from particularly the asynchronous condition)], in the ambient field level monitor device 1 (1*a*), the synchronization decision section 23 outputs a time constant control signal to the ambient field level monitoring unit 36 which in turn, decreases its own time constant to the smaller value.

Figure 5B:
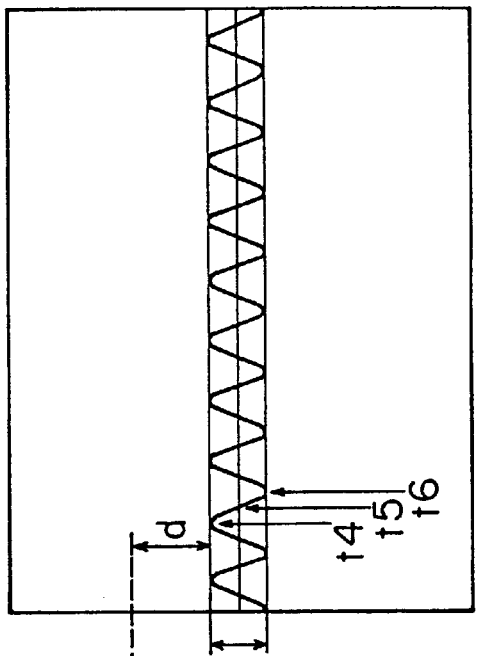
FIG. 5B is an illustration of an RSSI detection voltage waveform appearing when the capacitor in the ambient field level monitoring unit has a large value.
Figure 5A:
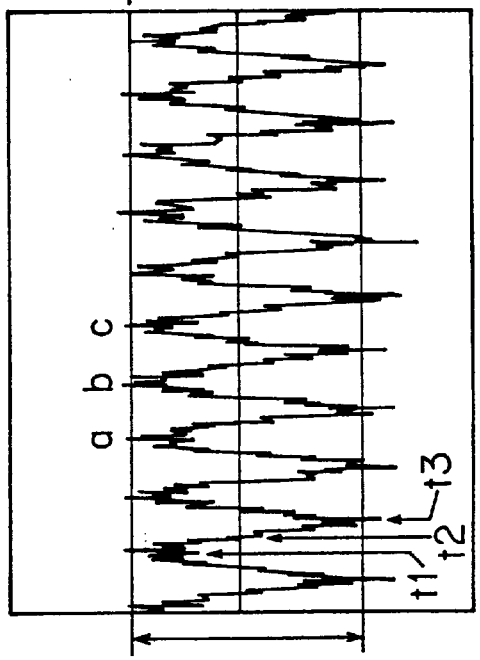
FIG. 5A is an illustration of an RSSI detection voltage waveform appearing when a capacitor in an ambient field level monitoring unit has a small value.

FIG. 5A is an illustration of an RSSI detection voltage waveform appearing when the value of the capacitor in the ambient field level monitoring unit 36 has a small value (for example, when 100 pF is given thereto). This waveform is a one when the signal is modulated all "1". In the synchronization acquisition condition, this radio mobile terminal is in synchronism for the R slot time period, and as indicated at portions denoted by marks a, b and c in FIG. 5A, at the portions showing a high I/Q orthogonality in the reception wave, the sampling is possible to permit the measurement of an RSSI value. Incidentally, the interval among a, b and c is a time corresponding to the inverse number of the symbol interval at 21 kHz. Further, the horizontal axes and vertical axes in FIGS. 5A and 5B use the same scale.

On the other hand, FIG. 5B is an illustration of an RSSI detection voltage waveform appearing when the capacitor in the ambient field level monitoring unit 36 has a large value (for example, when 1000 pF is set therein). This waveform is a one when the signal is modulated all "1". This radio mobile terminal is not synchronized for the I slot time period (is in the asynchronous state), and conducts the carrier sense during this time period, and the ambient field level monitor device 1 makes the synchronization decision section 23 output a time constant control signal to the ambient field level monitoring unit 36, thereby setting the time constant to a large value. Thus, the time constant increases as shown in FIG. 5B, so that the RSSI voltage waveform is uniformed through the integration and, even if the sampling is made at the sampling timings t4, t5 and t6, the difference among the measurement results at each points according to these timings decreases. Further, at this time, the wave height goes low to produce a difference indicated at a mark d in FIG. 5B. For this reason, simultaneously the correction of the RSSI values is made in terms of the measurement results. With this processing, in the case of no synchronization with the inputted radio signal (in the asynchronous condition), in the ambient field level monitor device 1 (1*a*), the synchronization decision section 23 sets the time constant control signal to the ambient field level monitoring unit 36 to a "high" state to set the time constant to a large value. On the other hand, in the case of the synchronization with the inputted radio signal (in the synchronous condition), in the ambient field level monitor device 1 (1*a*), the synchronization decision section 23 sets the time constant control signal to the ambient field level monitoring unit 36 to a "low" state to return the time constant to the previous value.

In this way, without affecting the RSSI measurement in the synchronous condition, it is possible to reduce the RSSI level measurement errors in a peripheral zone in the asynchronous condition. Thus, the radio mobile terminal can surely make the zone selection and can prevent the interruption of communications. Additionally, since there is no need to increase the time constant value in the synchronous condition with a radio signal, it is possible to removes the troubles such as the diversity malfunction, the reduction of the diversity gain, and further to eliminate the disadvantages such as the decrease in the RSSI detection value.

Figure 6B:
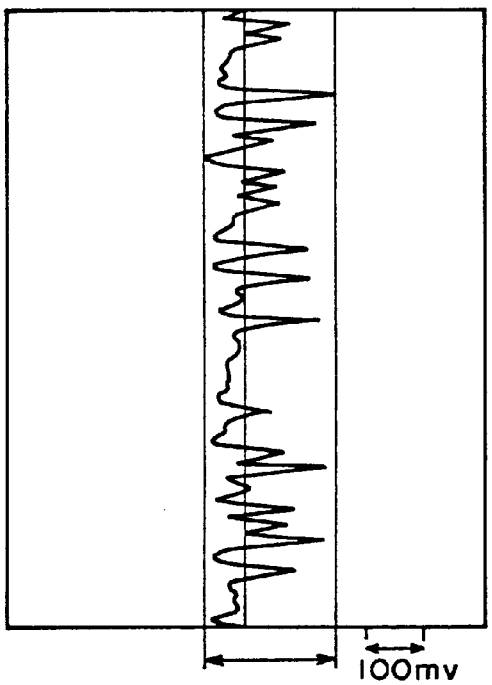
FIG. 6B is an illustration of another RSSI detection voltage waveform appearing when the capacitor in the ambient field level monitoring unit has a large value (under fading)
Figure 6A:
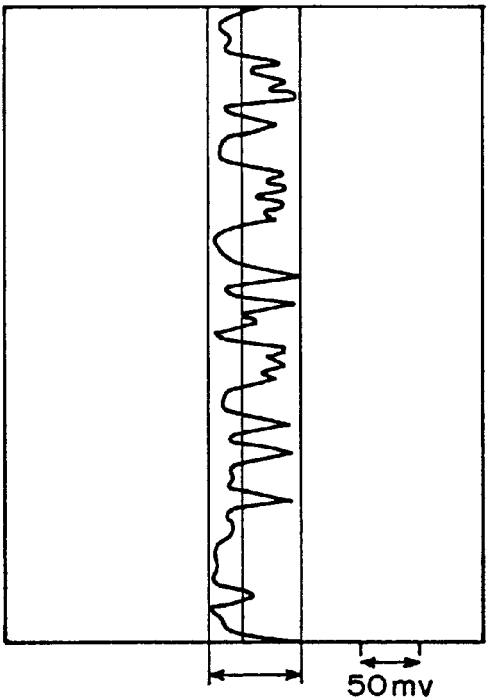
FIG. 6A is an illustration of another RSSI detection voltage waveform appearing when the capacitor in the ambient field level monitoring unit has a small value (under fading)

FIGS. 6A and 6B are illustrations of RSSI detection waveforms under fading. FIG. 6A is an illustration of another RSSI detection voltage waveform appearing when the capacitor in the ambient field level monitoring unit 36 has a small value, while FIG. 6B is another illustration of an RSSI detection voltage waveform appearing when the capacitor in the ambient field level monitoring unit 36 has a large value. In these illustrations, the scales of the horizontal axes are identical to each other, whereas the scales of the vertical axes are different from each other, that is, 1 DIV (division) is of the vertical axis scale in FIG. 6A corresponds to 100 mV while 1 DIV (division) thereof in FIG. 6B corresponds to 50 mV. Also in this case, since the capacitor value increases, the amplitude variation appears in a smaller range.

Thus, the RSSI time constant is set to a small value in the synchronous condition while being set to a large value in the asynchronous condition, with the result that, without exerting influence on the RSSI measurement in the synchronous condition, stable and high-accuracy RSSI measurement becomes possible.

On the contrary, at the variation from the asynchronous condition to the synchronous condition, as well as described with reference to FIG. 2A, the TDMA control unit 18 outputs a time constant control signal to the ambient field level monitoring unit 36 to return the time constant to the original value, and since the time constant is set to a small value (the capacitor has the small value) when the R slot time period again comes, the stable and high-accuracy RSSI measurement becomes feasible.

(A1) Description of First Modification of First Embodiment of this Invention

Figure 7:
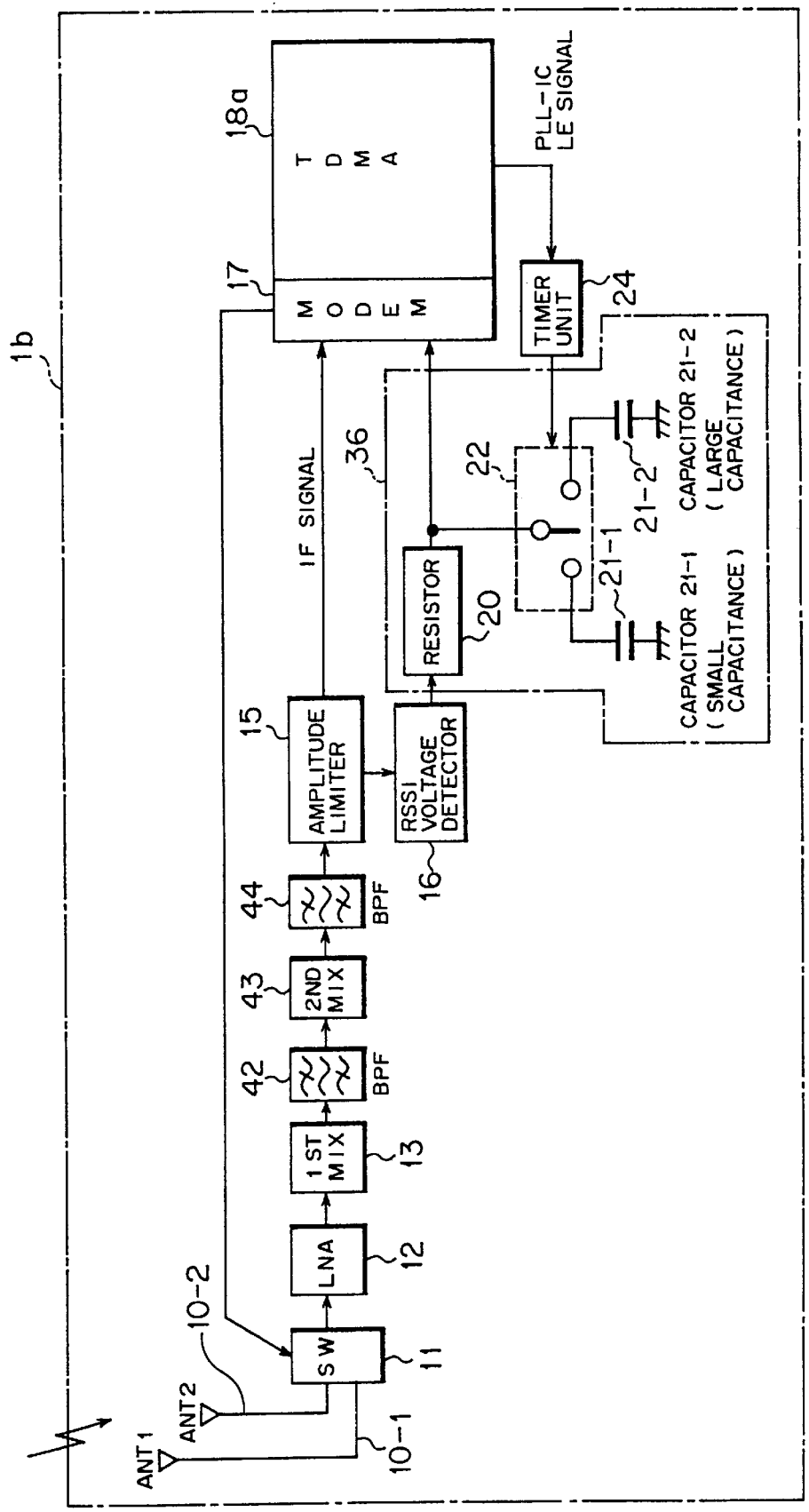
FIG. 7 is a block diagram showing an ambient field level monitor device according to a first modification of the first embodiment of this invention.

In this invention, for the synchronization decision section 23, it is also possible to use an LE (Load Enable) input signal to a PLL-IC as a time constant switching signal. FIG. 7 is a block diagram showing an ambient field level monitor device according to a first modification of the first embodiment of this invention. As shown in FIG. 7, this ambient field level monitor device 1b includes a timer unit 24.

That is, this ambient field level monitor device 1b has a TDMA control unit 18a and the timer unit 24 in addition to an antenna switching unit 11, an amplifier 12, a first frequency converter 13, a first intermediate frequency filter (BPF) 42, a second frequency converter (2ND MIX) 43, a second intermediate frequency filter (BPF) 44, an amplitude limiter 15, an RSSI voltage detector 16, a modulator/demodulator 17 and an ambient field level monitoring unit 36.

The TDMA control unit 18a is for monitoring the transmission/reception slot timings and further for judging the synchronous condition/asynchronous condition on the basis of a demodulated signal from the modulator/demodulator 17. Further, the timer unit 24 is for outputting a time constant control signal to the ambient field level monitoring unit 36 to return the time constant, which has changed in response to the LE signal to the PLL-IC, to the previously set value after the elapse of a predetermined period of time from the leading edge (or trailing edge) of the LE signal to the PLL-IC. This given time period signifies a value to be measured by the timer unit 24, and is variable through a line design. That is, the ambient field level monitor device 1b uses the triggering by the timer unit 24 in place of conducting the switching to a plurality of channels for the carrier level measurement of peripheral zones.

Figure 2B:
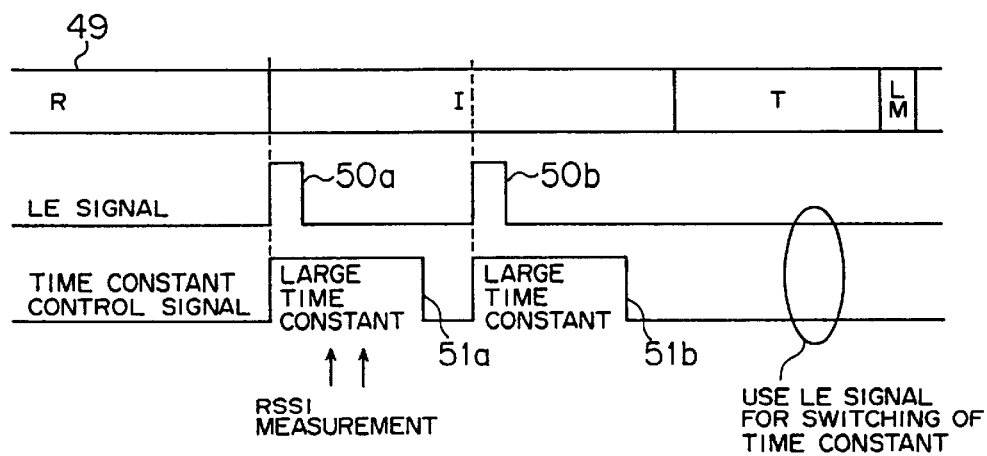
FIG. 2B is a timing chart useful for describing the switching of a time constant control signal by an LE signal.

FIG. 2B is a timing chart useful for explaining the switching of a time constant control signal by an LE signal. In FIG. 2B, LE (Load Enable) signals 50a, 50b are to be sent to the PLL-IC which generates a local oscillation frequency to be supplied to an RF (Radio Frequency) circuit (not shown) constituting the reception preliminary section 2-1, and are used for the set frequency data to be latched in a register of the PLL-IC.

Furthermore, the synchronization decision section 6 outputs a time constant control signal 54 (see FIG. 2A) at the same time of the switching of channel. In FIG. 2B, if the I slot time period of the time slot 49 comes, this radio mobile terminal successively performs the change to the frequencies of the transmission carriers of a plurality of base stations in adjacent cells, which are stored in advance, and outputs the LE signals 50a, 50b to the PLL-IC for locking at these frequencies. FIG. 2B signifies that the LE signal is outputted twice (50a, 50b) so that the PTL-IC changes the carrier twice.

A time constant control signal 51a, 51b is outputted to the ambient field level monitoring unit 36 for the switching to the capacitor 21-2 with a larger capacitance value so that the RSSI time constant is set to a large value for a predetermined period of time from the leading edge (or trailing edge) of the LE signal to the PLL-IC, and the switching to the capacitor 21-1 with a smaller capacitance value is then made so that the RSSI time constant again takes a small value after the elapse of the predetermined period of time set in the timer unit 24. Thus, the ambient field level monitor device 1b switches the time constant for the given time period from receiving a channel switching signal through the use of the channel switching signal.

The other parts are the same as those described above, and the description thereof will be omitted for brevity.

With the above-described configuration, if the I slot (asynchronous condition) comes when an LE signal is outputted to the PLL-IC, the setting of the time constant is changed. First, in the LM slot and the R slot (synchronization acquisition condition), in the ambient field level monitor device 1b, the timer unit 24 outputs a time constant control signal to the ambient field level monitoring unit 36 to set the time constant to a small value. Further, in the I slot (asynchronous condition) where an LE signal is outputted to the PLL-IC, in the ambient field level monitor device 1b, the timer unit 24 outputs a time constant control signal to the ambient field level monitoring unit 36 to set the time constant to a large value.

Furthermore, when the I slot comes where the LE signal is outputted to the PLL-IC, the time constant is set to a large value to allow the measurement of an appropriate RSSI value, and if the a predetermined time period (timer set value) in the I slot elapses, the time constant is automatically set to the original (previous) value.

In this way, the use of the timer unit 24 capable of adjusting the given time period similarly ensures the stable and high-accuracy RSSI measurement. Additionally, without affecting the RSSI measurement in the R slot, it is possible to reduce the RSSI level measurement error of a peripheral zone in the I slot where the LE signal is outputted to the PLL-IC, which permits precise zone selection and prevents the interruption of communications. Still additionally, it is possible to eliminate the problems such as the diversity malfunction and the reduction of the diversity gain, and further to overcome the troubles such as the decrease in the RSSI detection value.

(A2) Description of Second Modification of First Embodiment of this Invention

The aforesaid ambient field level monitoring unit 36 can employ another configuration-practicably, and a modification of the ambient field level monitoring unit 36 will be described hereinbelow.

Figure 8:
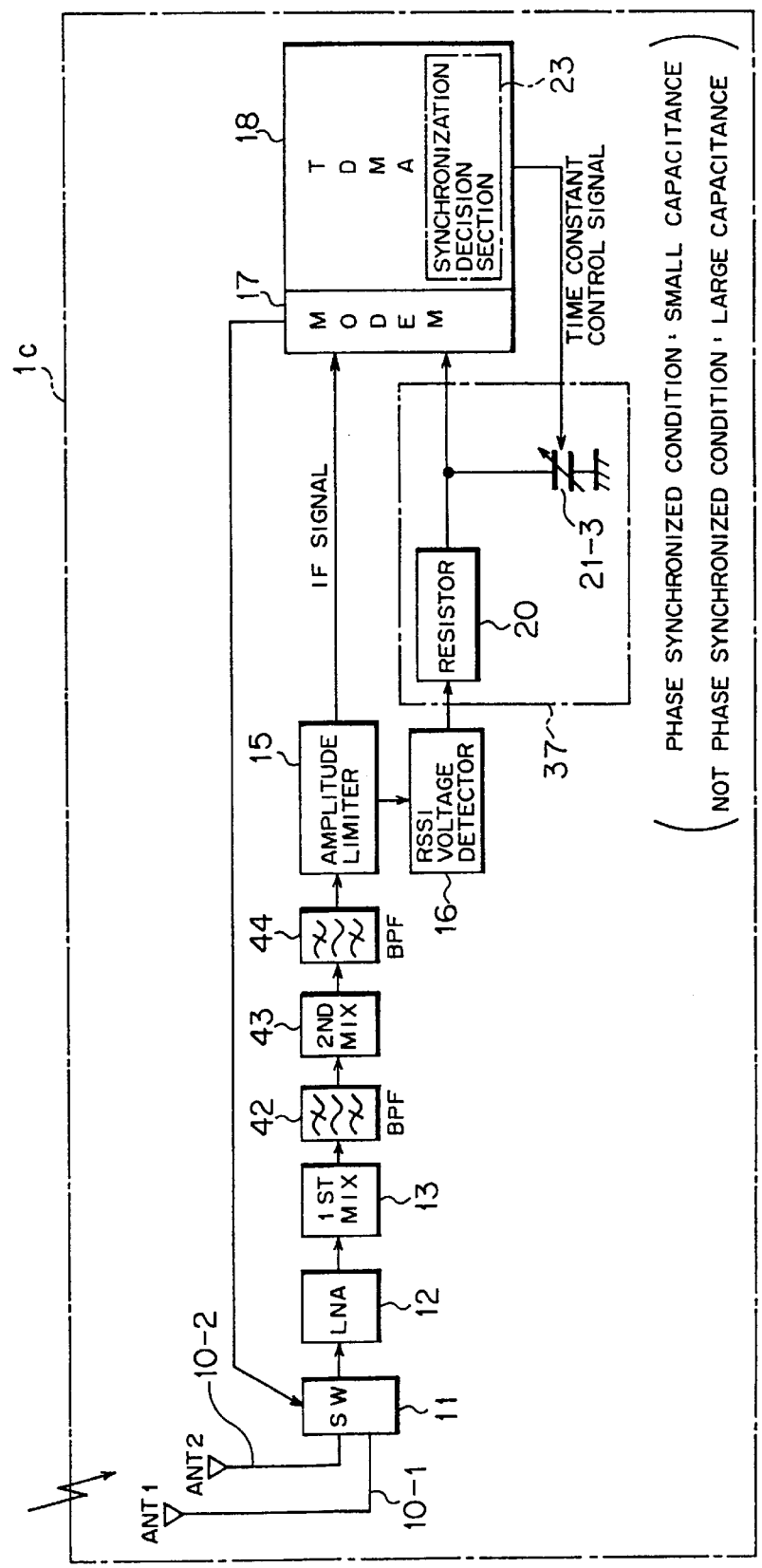
FIG. 8 is a block diagram showing an ambient field level monitor device according to a second modification of the first embodiment of this invention.

FIG. 8 is a block diagram showing an ambient field level monitor device according to a second modification of the first embodiment of this invention. The ambient field level monitor device 1c, shown in FIG. 8, is provided with an ambient field level monitoring unit 37 in addition to reception antennas 10-1, 10-2, an antenna switching unit 11, an amplifier 12, a first frequency converter 13, a first intermediate frequency filter 42, a second frequency converter 43, a second intermediate frequency filter 44, an amplitude limiter 15, an RSSI voltage detector 16, a modulator/demodulator 17 and a TDMA control unit 18.

Furthermore, this ambient field level monitoring unit 37 is made up of a fixed resistor 20 and a variable-capacitance capacitor 21-3, where the RSSI time constant is controlled by using a device capable of changing its capacitance without performing the switching between two capacitors. That is, this ambient field level monitoring unit 37 is constructed by a combination of the capacitor 21-3 and the fixed resistor 20, and constructed in the form of an analog integrating circuit in which the capacitor 21-3 is made such that its impedance value is variable. Besides, the other parts are the same as those described above, and the description thereof will be omitted for simplicity.

With this arrangement, the change of setting of the time constant is made at the variation from the synchronous condition to the asynchronous condition. First, in the case of the synchronous condition (in the synchronization acquisition condition or phase synchronized condition) with the inputted radio signal, in the ambient field level monitor device 1c, the synchronization decision section 23 outputs a time constant control signal to the ambient field level monitoring unit 37 to set the time constant at a small value. Further, in the case of no synchronism (in the asynchronous condition or not phase synchronized condition) with the inputted radio signal, in this ambient field level monitor device 1c, the synchronization decision section 23 outputs a time constant control signal to the ambient field level monitoring unit 37 to set the time constant at a large value.

Furthermore, at the variation from the synchronous condition to the asynchronous condition, the time constant is set to the large value for the measurement of the appropriate RSSI value, whereas, at the variation from the asynchronous to the synchronous condition, that time constant is automatically set to the original value.

Thus, without affecting the RSSI measurement in the synchronous condition, it is possible to reduce the RSSI level measurement error of a peripheral zone in the asynchronous condition, which permits stable and high-accuracy RSSI measurement. In addition, precise zone selection is feasible and the interruption of communications is preventable. Still additionally, since there is no need to increase the time constant in the synchronous condition with the radio signal, it is possible to eliminate the problems such as the diversity malfunction and the reduction of the diversity gain, and further to overcome the troubles such as the decrease in the RSSI detection value.

(A3) Description of Third Modification of First Embodiment of this Invention

The aforesaid synchronization decision section 23 in the second modification of the first embodiment can take another modification practicably, and this modification will be described hereinbelow.

Figure 9:
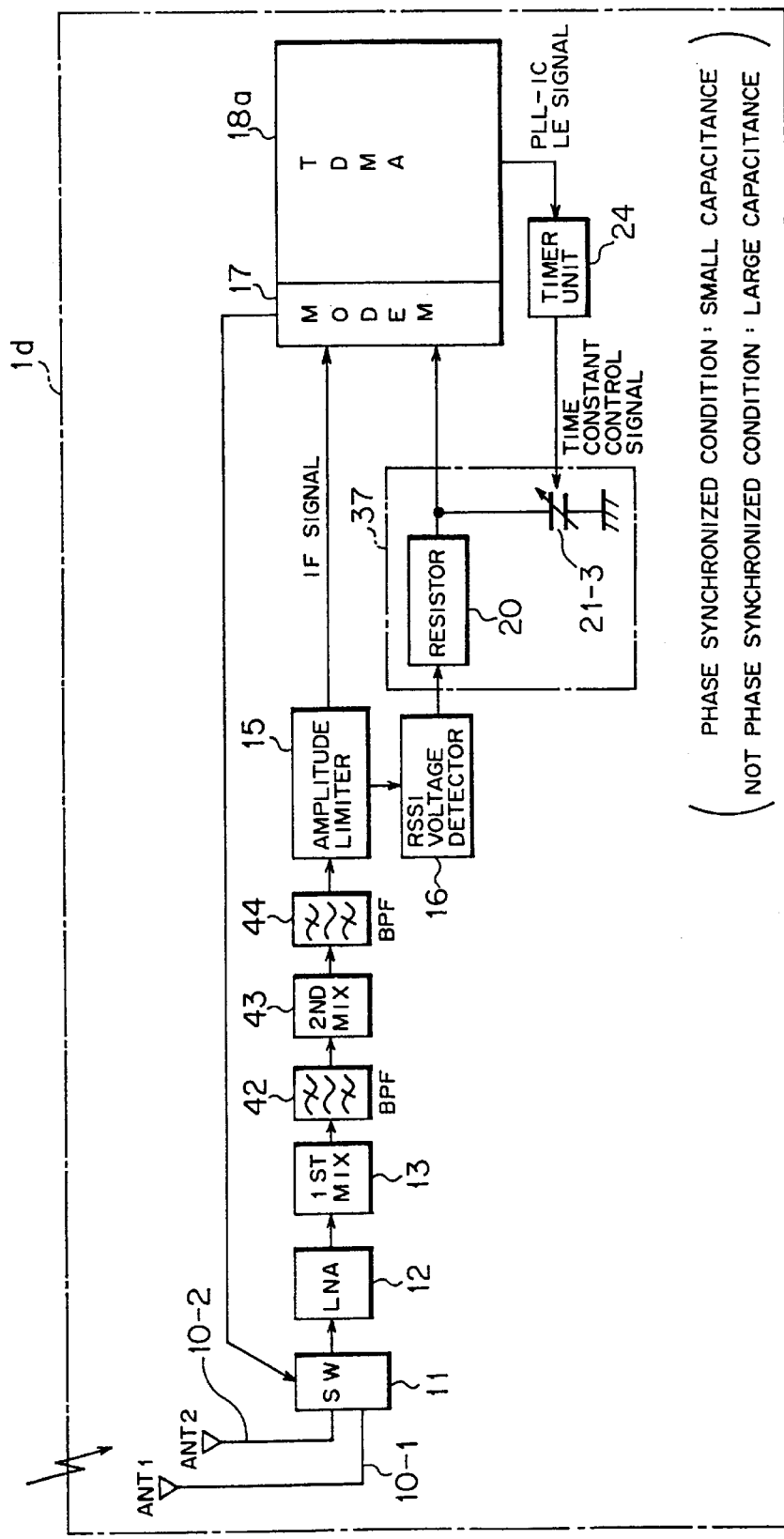
FIG. 9 is a block diagram showing an ambient field level monitor device according to a third modification of the first embodiment of this invention.

FIG. 9 is a block diagram showing an ambient field level monitor device according to a third modification of the first embodiment of this invention. The ambient field level monitor device 1d, shown in is FIG. 9, is provided with, in addition to reception antennas 10-1, 10-2, an antenna switching unit 11, an amplifier 12, a first frequency converter 13, a first intermediate frequency filter 42, a second frequency converter 43, a second intermediate frequency filter 44, an amplitude limiter 15, an RSSI voltage detector 16, a modulator/demodulator 17 and an ambient field level monitoring unit 37, a TDMA control unit 18a for monitoring the transmission/reception slot timings and further for making a decision on the synchronous condition/asynchronous condition on the basis of a demodulated signal from the modulator/demodulator 17 and a timer unit 24 for outputting a signal to the ambient field level monitoring unit 37 so that a time constant control signal changed in response to an LE signal to the PLL-IC is returned to the original set state after the elapse of a predetermined period of time from the leading edge (or trailing edge) of the LE signal to the PLL-IC.

A time constant control signal is outputted to the ambient field level monitoring unit 37 to change and set the capacitance value of a variable capacitance capacitor 21-3 so that the RSSI time constant is set to a large value for a predetermined period of time to be measured by the timer unit 24 from the leading edge of the LE signal to the PLL-IC. Incidentally, the other parts are the same as those described above, and the description thereof will be omitted for brevity.

With this configuration, the change of setting of the time constant is made in the I slot where an LE signal to the PLL-IC is set. First, in the LM slot and the R slot (synchronous condition), the ambient field level monitor device 1d makes the timer unit 24 output a time constant control signal to the ambient field level monitoring unit 37 to set the time constant to a small value. Further, in the I slot (asynchronous condition) where the LE signal to the PLL-IC is set, this ambient field level monitor device 1d makes the timer unit 24 output a time constant control signal to the ambient field level monitoring unit 37 to set the time constant to a large value for a predetermined period of time from the input of the PLL-IC LE signal.

Furthermore, when the I slot comes in which the LE signal is inputted to the PLL-IC, the time constant is set to the large value to enable the measurement of the appropriate RSSI value, and if a predetermined time elapses after the LE signal to the PLL-IC is set in the I slot, that time constant is automatically returned to the original value. Thus, the ambient field level monitor device 1d is made to switch the time constant for a predetermined period of time from receiving a channel switching signal through the use is of the channel switching signal.

In this way, according to this modification, since the capacitance value of the variable-capacitance capacitor 21-3 can continuously be changed and set, fine time constant control becomes possible, and the error of the RSSI level measurement of a peripheral zone is reducible in the I slot (asynchronous condition) without exerting influence on the RSSI measurement in the R slot and the LM slot (synchronous condition), with the result that stable and high-accuracy RSSI measurement is feasible. In addition, precise zone selection is feasible and the interruption of communications is preventable. Still additionally, since there is no need to increase the time constant in the synchronous condition with the radio signal, it is possible to eliminate the problems such as the diversity malfunction and the reduction of the diversity gain, and further to overcome the troubles such as the decrease in the RSSI detection value.

(A4) Description of Fourth Modification of First Embodiment of this Invention

Figure 10:
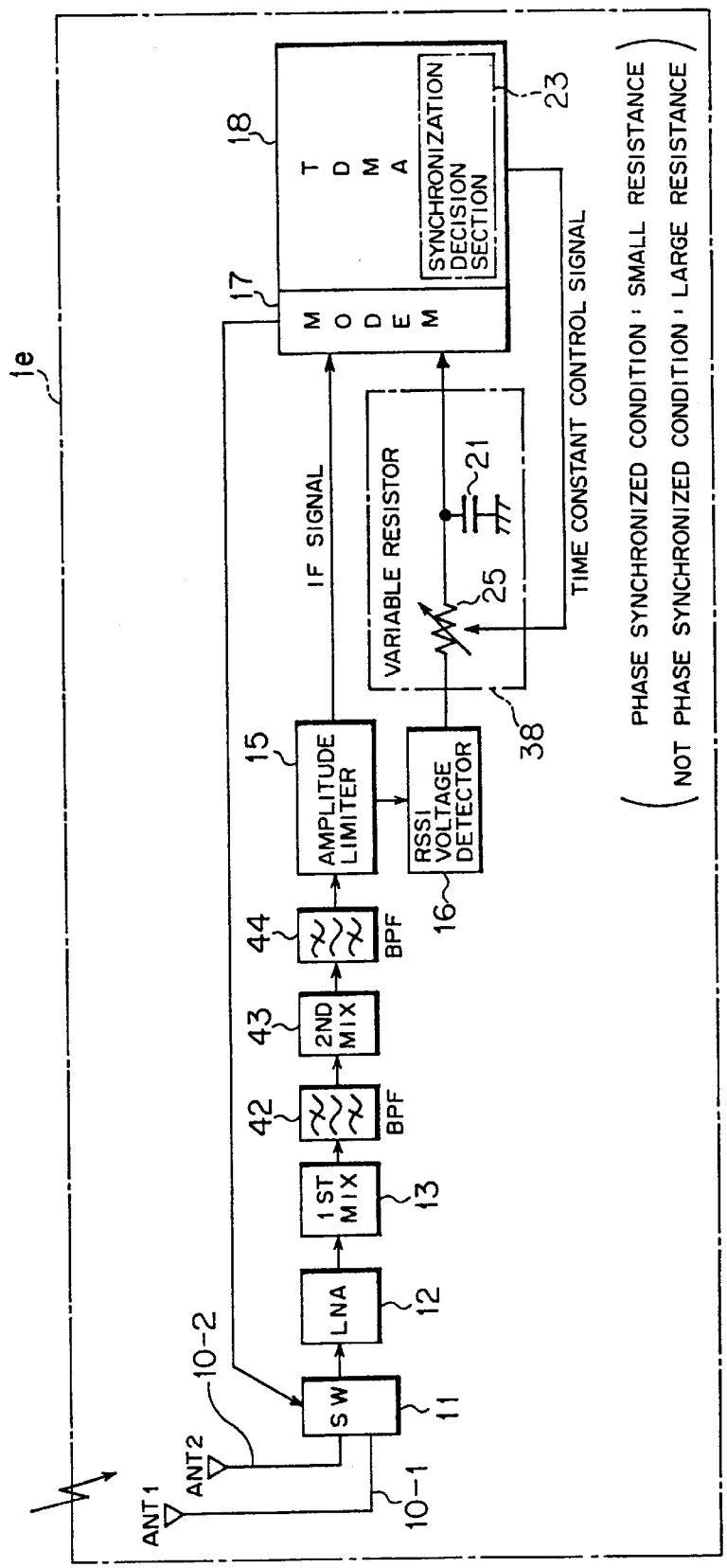
FIG. 10 is a block diagram showing an ambient field level monitor device according to a fourth modification of the first embodiment of this invention.

FIG. 10 is a block diagram showing an ambient field level monitor device according to a fourth modification of the first embodiment of this invention. In FIG. 10, the ambient field level monitor device 1e is equipped with an ambient field level monitoring unit 38 in addition to reception antennas 10-1, 10-2, an antenna switching unit 11, an amplifier 12, a first frequency converter 13, a first intermediate frequency filter 42, a second frequency converter 43, a second intermediate frequency filter 44, an amplitude limiter 15, an RSSI voltage detector 16, a modulator/demodulator 17 and a TDMA control unit 18.

This ambient field level monitoring unit 38 includes a variable resistor 25 and a fixed-capacitance capacitor 21, and made to control the RSSI time constant by changing the resistance value of the variable resistor 25 in accordance with the phase synchronized condition. That is, this ambient field level monitoring unit 38 is constructed by a combination of the capacitor 21 and the variable resistor 25, and constructed in the form of an analog integrating circuit in which the variable resistor 25 is made such that its impedance value is variable. The other parts are the same as those described above, and the description thereof will be omitted for brevity.

With this configuration, when the variation occurs from the synchronous condition to the asynchronous condition, first, in the synchronous condition, the ambient field level monitor device 1e makes the synchronization decision section 23 send a time constant control signal to the ambient field level monitoring unit 38 to set its time constant to a small value. On the other hand, in the asynchronous condition, the ambient field level monitor device 1e makes the synchronization decision section 23 issue a time constant control signal to the ambient field level monitoring unit 38 to set the time constant to a large value.

Thus, when the variation occurs from the synchronous condition to the asynchronous condition, setting the time constant to the large value enables the measurement of a proper RSSI value, while, when the asynchronous condition turns to the synchronous condition, the time constant is automatically set to the original value.

In this way, the error of the RSSI level measurement of a peripheral zone is reducible in the asynchronous condition without exerting influence on the RSSI measurement in the synchronous condition, with the result that stable and high-accuracy RSSI measurement is feasible. In addition, precise zone selection is feasible and the interruption of communications is preventable. Still additionally, since there is no need to increase the time constant in the synchronous condition with the radio signal, it is possible to eliminate the problems such as the diversity malfunction and the reduction of the diversity gain, and further to overcome the troubles such as the decrease in the RSSI detection value.

Besides, it is also appropriate that, in place of the variable resistor 25, two types of fixed resistors different in resistance value from each other and one switch are prepared so that this switch chooses one of these fixed resistors in accordance with a "high" state/"low" state of a time constant control signal from the external. Concretely, the resistor with a low resistance value is selected when the device 1e is in synchronism with the inputted radio signal while the resistor with a high resistance value is selected when it is out of synchronism with the inputted radio signal so that the time constant value of this lowpass filter is set to be larger than that to be taken when being in synchronism with the inputted radio signal for a predetermined period of time. This method can offer the same effects as those described above.

(A5) Description of Fifth Modification of First Embodiment of this Invention

Figure 11:
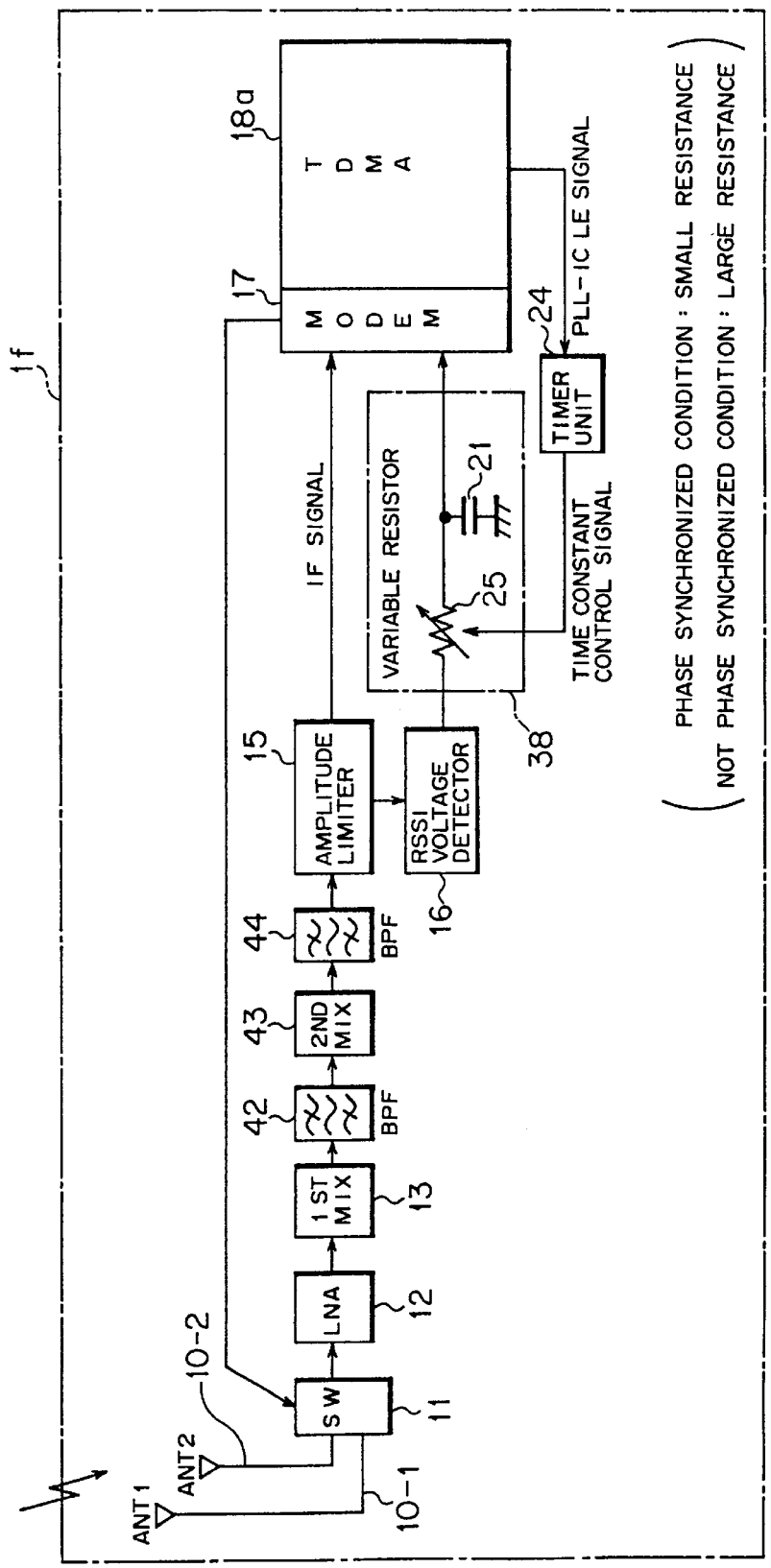
FIG. 11 is a block diagram showing an ambient field level monitor device according to a fifth modification of the first embodiment of this invention.

FIG. 11 is a block diagram showing an ambient field level monitor device according to a fifth modification of the first embodiment of this invention. In FIG. 11, in addition to reception antennas 10-1, 10-2, an antenna switching unit 11, an amplifier 12, a first frequency converter 13, a first intermediate frequency filter 42, a second frequency converter 43, a second intermediate frequency filter 44, an amplitude limiter 15, an RSSI voltage detector 16, a modulator/demodulator 17 and an ambient field level monitoring unit 38, the ambient field level monitor device 1f is equipped with a TDMA control unit 18a for monitoring the transmission/reception slot timings and further for making a decision on synchronous condition/asynchronous condition on the basis of a demodulated signal from the modulator/demodulator 17 and a timer unit 24 for outputting a time constant control signal to the ambient field level monitoring unit 38 to return the time constant, which has changed in response to an LE signal to an PLL-IC, to the previously set value after the elapse of a predetermined period of time from a leading edge (or trailing edge) of the LE signal to the PLL-IC.

Furthermore, a time constant control signal is outputted to the ambient field level monitoring unit 38 to change and set the resistance value of the variable resistor 25 so that the RSSI time constant is set to a large value for a predetermined period of time counted by the timer unit 24. Besides, the other parts are the same as those described above, and the description thereof will be omitted for brevity.

With this configuration, first, in the LM slot and the R slot (synchronous condition), in the ambient field level monitor device if, the timer unit 24 issues a time constant control signal to the ambient field level monitoring unit 38 to set the time constant to a small value. Further, in the I slot (asynchronous condition) in which an LE signal is outputted, in the ambient field level monitor device 1f, the timer unit 24 outputs a time constant control signal to the ambient field level monitoring unit 38 to set the time constant to a large value for a predetermined period of time from the input of the PLL-IC LE signal. Still further, in the I slot in which the LE signal is outputted, the time constant is set to the large value to accomplish the measurement of a proper RSSI value, and after the elapse of a predetermined period of time, the time constant is automatically set to the original value. Thus, the ambient field level monitor device if is made to switch the time constant for a predetermined period of time from receiving a channel switching signal through the use of the channel switching signal.

Accordingly, according to this modification, since the resistance value of the variable resistor 25 can continuously be changed and set, fine time constant control becomes possible, and the error of the RSSI level measurement of a peripheral zone is reducible in the I slot without exerting influence on the RSSI measurement in the R slot and the LM slot, with the result that stable and high-accuracy RSSI measurement is feasible. In addition, precise zone selection is feasible and the interruption of communications is preventable. Still additionally, since there is no need to increase the time constant in the LM slot and the R slot (in the synchronous condition with the radio signal), it is possible to eliminate the problems such as the diversity malfunction and the reduction of the diversity gain, and further to overcome the troubles such as the decrease in the RSSI detection value.

Besides, it is also appropriate that, in place of the variable resistor 25, two types of fixed resistors different in resistance value from each other and one switch are prepared so that this switch chooses one of these fixed resistors in accordance with a "high" state/"low" state of a time constant control signal from the external. Concretely, the resistor with a low resistance value is selected in the LM slot and the R slot (in the synchronous condition with the inputted radio signal) while the resistor with a high resistance value is selected in the I slot (in the asynchronous condition with the inputted radio signal) for a predetermined period of time from the input of the PLL-IC LE signal so that the time constant value of this low-pass filter is set to be larger than that to be taken when being in synchronism with the inputted radio signal for the predetermined period of time. This method can offer the same effects as those described above.

(A6) Description of Sixth Modification of First Embodiment of this Invention

Figure 12:
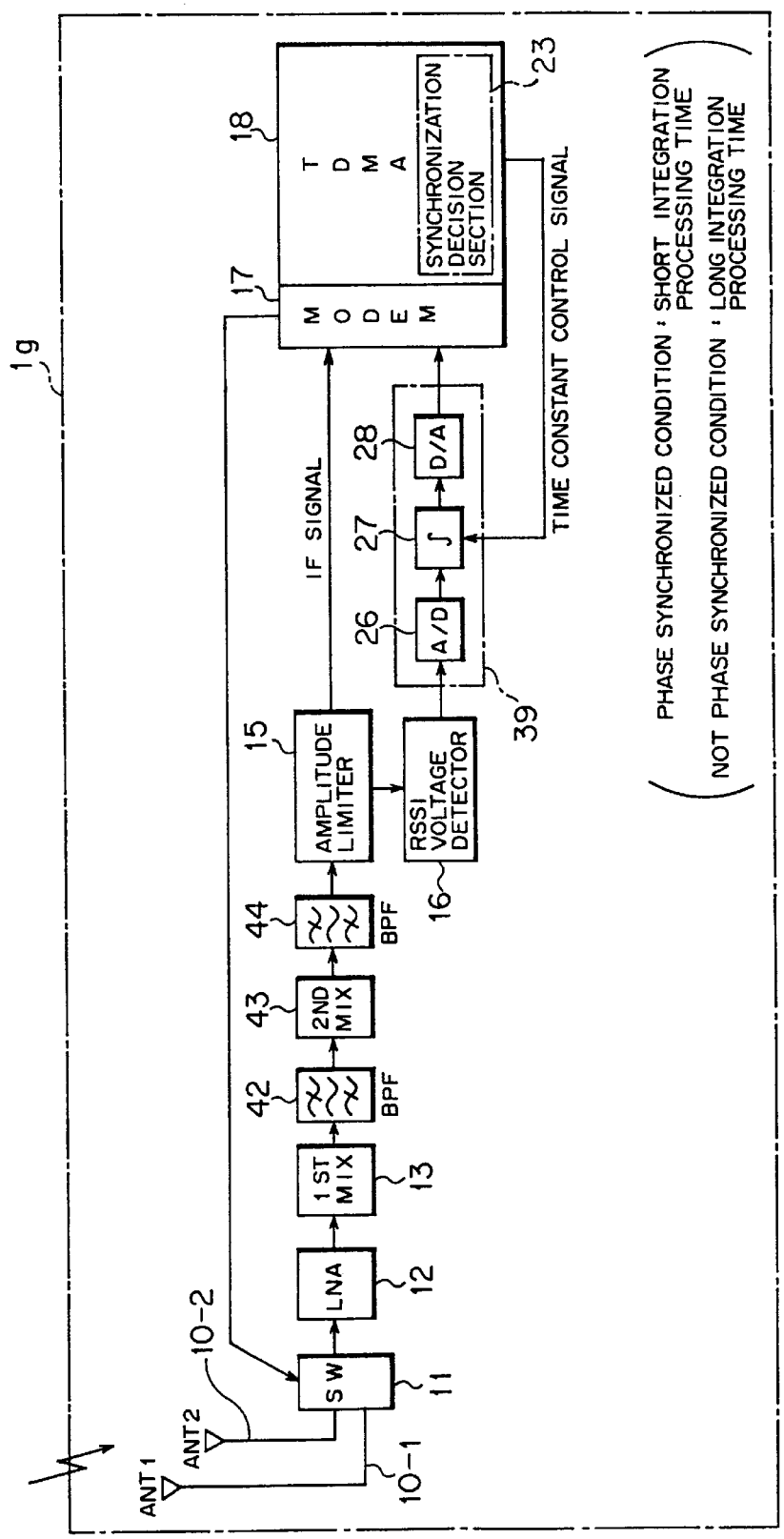
FIG. 12 is a block diagram showing an ambient field level monitor device according to a sixth modification of the first embodiment of this invention.

FIG. 12 is a block diagram showing an ambient field level monitor device according to a sixth modification of the first embodiment of this invention. In FIG. 12, the ambient field level monitor device 1g is provided with an ambient field level monitoring unit 39 in addition to reception antennas 10-1, 10-2, an antenna switching unit 11, an amplifier 12, a first frequency converter 13, a first intermediate frequency filter 42, a second frequency converter 43, a second intermediate frequency filter 44, an amplitude limiter 15, an RSSI voltage detector 16, a modulator/demodulator 17 and a TDMA control unit 18.

Furthermore, this ambient field level monitoring unit 39 includes an analog/digital converter 26, a digital integrating circuit 27 and a digital/analog converter 28.

In this arrangement, the analog/digital converter 26 is for conducting an analog-to-digital conversion of an ambient field level signal being an analog signal from the receive side, and the digital integrating circuit 27 is for integrating a digital signal from the analog/digital converter 26 and is designed such that its integrating state is variable, and further, the digital/analog converter 28 is for performing a digital-to-analog conversion of a digital signal from the digital integrating circuit. The other parts are the same as those described above, and the description thereof will be omitted for simplicity.

With this configuration, an ambient field level signal outputted from the RSSI voltage detector 16 is subjected to the analog-to-digital conversion in the analog/digital converter 26. Further, the ambient field level signal analog-to-digital-converted is integrated in the digital integrating circuit 27. At this time, this integration processing time is made to be altered in accordance with a phase synchronizing state. Further, the integrated signal is digital-to-analog-converted in the digital/analog converter 28 and then outputted to the modulator/demodulator 17.

Furthermore, with this configuration, in the synchronous condition, in the ambient field level monitor device 1g, the synchronization decision section 23 issues a time constant control signal to the ambient field level monitoring unit 39 to shorten the integration processing time, whereas, in the asynchronous condition, in the ambient field level monitor device 1g, the synchronization decision section 23 outputs a time constant control signal to the ambient field level monitoring unit 39 to prolong the integration processing time. When the integration processing time becomes long, the RSSI voltage waveform is made uniform and, hence, the difference between the measurement results caused by the difference between the sampling timings becomes small. Further, at this time, since a waveform whose wave height goes low appears, the correction of the RSSI value is made simultaneously in terms of the measurement results.

Still further, at the variation from the synchronous condition to the asynchronous condition, the integration processing time is prolonged for the measurement of an appropriate RSSI value, while at the variation from the asynchronous condition to the synchronous condition, the integration processing time is automatically returned to the original value.

In this way, the error of the RSSI level measurement of a peripheral zone is reducible in the asynchronous condition without exerting influence on the RSSI measurement in the synchronous condition; therefore, stable and high-accuracy RSSI measurement is feasible. In addition, precise zone selection is feasible and the interruption of communications is preventable. Still additionally, since there is no need to increase the time constant in the synchronous condition with the radio signal, it is possible to eliminate the problems such as the diversity malfunction and the reduction of the diversity gain, and further to overcome the troubles such as the decrease in the RSSI detection value.

(A7) Description of Seventh Modification of First Embodiment of this Invention

Figure 13:
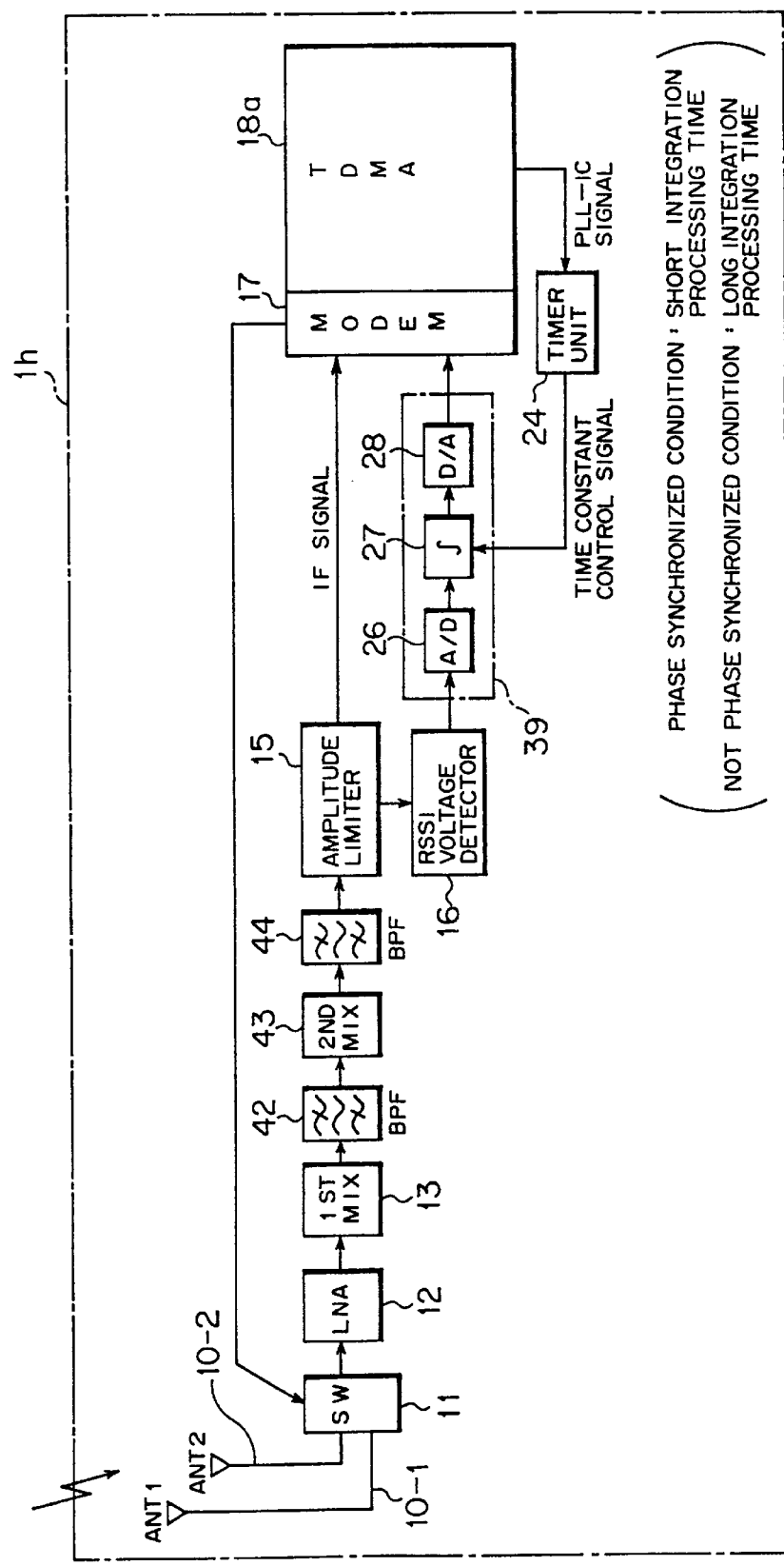
FIG. 13 is a block diagram showing an ambient field level monitor device according to a seventh modification of the first embodiment of this invention.

FIG. 13 is a block diagram showing an ambient field level monitor device according to a seventh modification of the first embodiment of this invention. In FIG. 13, in addition to reception antennas 10-1, 10-2, an antenna switching unit 11, an amplifier 12, a first frequency converter 13, a first intermediate frequency filter 42, a second frequency converter 43, a second intermediate frequency filter 44, an amplitude limiter 15, an RSSI voltage detector 16, a modulator/demodulator 17 and an ambient field level monitoring unit 39, the ambient field level monitor device 1h is provided with a TDMA control unit 18a for monitoring the transmission/reception slot timings and further for making a decision on the synchronism/no synchronism on the basis of a demodulated signal from the modulator/demodulator 17 and a timer unit 24 for outputting a time constant control signal to the ambient field level monitoring unit 39 to return the time constant, which has change in response to an LE signal to the PLL-IC, to its previously set value after the elapse of a predetermined period of time from the leading edge (or trailing edge) of the LE signal to the PLL-IC.

That is, a time constant control signal is outputted to the ambient field level monitoring unit 39 to change and set the integration time in the digital integrating circuit 27 of the ambient field level monitoring unit 39 so that the RSSI time constant is set to a large value for a predetermined period of time measured by the timer unit 24 from the leading edge of the LE signal to the PLL-IC. The other parts are the same as those described above, and the description thereof will be omitted for simplicity.

With this configuration, first, in the LM slot and the R slot (synchronization acquisition condition), in the ambient field level monitor device 1h, the timer unit 24 issues a time constant control signal to the ambient field level monitoring unit 39 to set the integration time in the digital integrating circuit 27 to a short value, while, in the I slot (asynchronous condition) where the LE signal is outputted, in the ambient field level monitor device 1h, the timer unit 24 outputs a time constant control signal to the ambient field level monitoring unit 39 to set the integration time in the digital integrating circuit 27 to a long value for a predetermined period of time from the leading edge of the LE signal to the PLL-IC. Further, when the integration processing time is prolonged, the RSSI voltage waveform is made uniform to decrease the difference among the measurement results caused by the difference among the sampling timings. Still further, at this time, since a waveform that goes low in wave height appears, the correction of the RSSI value is simultaneously made in terms of the measurement results.

Moreover, when the I slot (asynchronous condition) comes where the LE signal is outputted, the integration processing time is set to a long value for the measurement of an appropriate RSSI value, while the integration processing time is automatically returned to the original value after the elapse of a predetermined period of time from the leading edge of the PLL-IC LE signal. Thus, the ambient field level monitor device 1h is made to switch the time constant or a predetermined period of time from receiving a channel switching signal through the use of the channel switching signal.

In this way, according to this modification, since the integration time of the digital integrating circuit 27 can be set and this value can continuously be altered, fine time constant control becomes possible, and the error of the RSSI level measurement of a peripheral zone is reducible in the I slot (asynchronous condition) without exerting influence on the RSSI measurement in the LM slot and the R slot (synchronous condition), with the result that stable and high-accuracy RSSI measurement is feasible. In addition, precise zone selection is feasible and the interruption of communications is preventable. Still additionally, since there is no need to increase the time constant in the LM slot and the R slot (in the synchronous condition with the radio signal), it is possible to eliminate the problems such as the diversity malfunction and the reduction of the diversity gain, and further to overcome the troubles such as the decrease in the RSSI detection value.

(B)Description of Second Embodiment of this Invention

It is also possible that the ambient field level monitoring unit in the above-described first embodiment and modifications thereof is practicably modified into a further different configuration.

Figure 14:
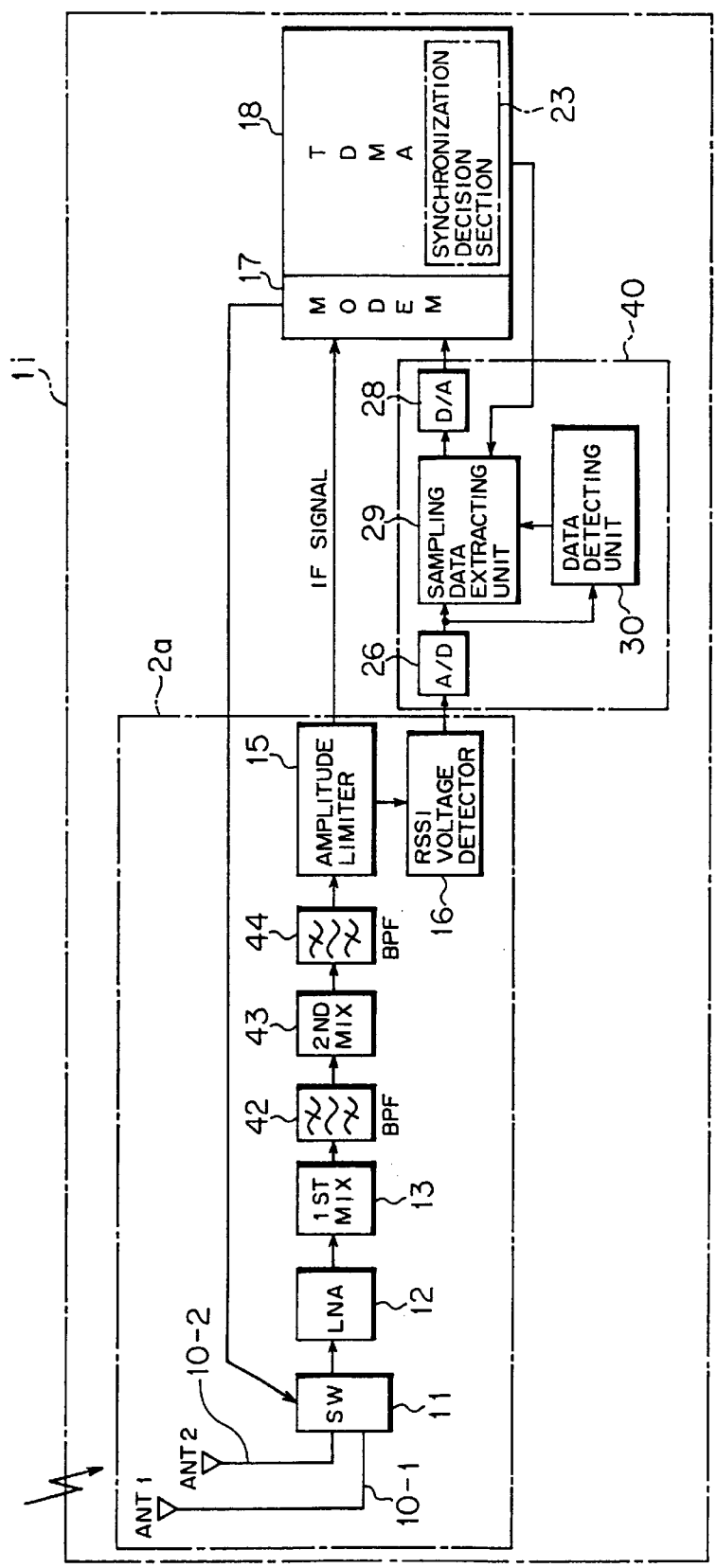
FIG. 14 is a block diagram showing an ambient field level monitor device according to a second embodiment of this invention.

FIG. 14 is a block diagram showing an ambient field level monitor device according to a second embodiment of this invention. In FIG. 14, the ambient field level monitor device 1$i$ is made up of a reception unit 2$a$, a modulator/demodulator 17, a TDMA control unit 18 and an ambient field level monitoring unit 40. This ambient field level monitoring unit 40 is not made to change a time constant unlike the above-described embodiment and modifications.

In this configuration, the reception unit 2$a$ is for receiving a radio signal to output a reception signal originating from the received radio signal and further to output an ambient field level signal. The reception unit 2$a$ is composed of reception antennas 10-1, 10-2, an antenna switching unit 11, an amplifier 12, a first frequency converter 13, a first intermediate frequency filter 42, a second frequency converter 43, a second intermediate frequency filter 44, an amplitude limiter 15 and an RSSI voltage detector 16. The components constituting this reception unit 2$a$, and the modulator/demodulator 17 are identical in function to those described above, and the description thereof will be omitted for brevity.

Furthermore, the ambient field level monitoring unit 40 receives the ambient field level signal from the reception unit 2$a$ (concretely, the RSSI voltage detector 16) to extract and digital-to-analog-convert data obtained by digitizing the ambient field level signal, thereby detecting an ambient field level. This ambient field level monitoring unit 40 is composed of an analog/digital converter 26, a sampling data extracting unit 29, a data detecting unit 30 and a digital/analog converter 28.

In this arrangement, the analog/digital converter 26 is for conducting an analog-to-digital conversion of the ambient level signal as an analog signal from the reception unit 2$a$ (concretely, the RSSI voltage detector 16), and the sampling data extracting unit 29 is for extracting digital signal data outputted from the analog/digital converter 26, with the digital data being extracted in accordance with an instruction from the data detecting unit 30.

The data detecting unit 30 is for detecting a point at which the ambient field level signal data, which has been in a level-increasing condition, begins to decrease in level. For example, this data varying point, that is, a portion at which the gradient (inclination) varies, signifies the position of each of the data varying points a, b and c in the RSSI voltage waveform shown in FIG. 5A. This function is achievable, for example, by using a differentiating circuit, and detects a point at which the gradient of the RSSI detection voltage changes from the positive to the negative to determine as RSSI detection data the ambient field level signal data at the detected point. Further, the digital/analog converter 28 is for performing the digital/analog conversion of digital signal data outputted from the sampling data extracting unit 29.

With this configuration, the ambient field level monitoring unit 40 accomplishes the ambient field level detection by receiving the ambient level signal from the reception unit 2$a$ and by extracting digital sampling data from the ambient field level signal to detect an ambient field level.

In addition, for the ambient field level detection, the ambient field level monitoring unit 40 uses different modes of extracting the digital sampling data from the ambient field level signal for when the synchronization decision section 23 makes a decision that the reception unit 2$a$ is out of synchronism with the inputted radio signal and for when the synchronization decision section 23 judges that it is in synchronism therewith.

Furthermore, the TDMA control unit 18 is for monitoring the transmission/reception slot timings and further for making a decision on the synchronous condition/asynchronous condition on the basis of a demodulated signal from the modulator/demodulator 17, and is provided with the synchronization decision section 23 for deciding whether or not the reception unit 2$a$ is synchronized with the inputted radio signal. Further, the synchronization decision section 23 outputs a control signal whereby the sampling data extracting unit 29 uses different data extraction intervals or the like for the synchronous condition and for the asynchronous condition. That is, the data extraction interval is shortened in the asynchronous condition while the data extraction interval is prolonged in the synchronous condition to extract the data at the symbol points.

With this configuration, in the case of the asynchronous condition, the data detecting unit 13 always monitors a point at which the gradient of the RSSI digital data varying momently changes, which is outputted from the analog/digital converter 26 to accurately find the position at which the data varies from the increasing condition to the decreasing condition, thus giving an instruction for the data extraction to the sampling data extracting unit 29. Further, the RSSI digital data at the variation (turning) point is determined as the detected RSSI value, and in the digital/analog converter 28, this digital data undergoes the digital-to-analog conversion and enters the modulator/demodulator 17. Still further, at the variation from the synchronous condition to the asynchronous condition, the data extraction interval is set to a short value for the measurement of an appropriate RSSI value, while at the variation from the asynchronous condition to the synchronous condition, it is automatically returned to the original value to extract the data at the symbol points.

In this way, according to this embodiment, in the case of the asynchronous condition, for example, by using a differentiating circuit, a point at which the gradient of the RSSI detection voltage changes from the positive to the negative is detected so that the RSSI detection voltage value at the detected point is determined as the RSSI detection value. Therefore, a high-accuracy RSSI value hardly including errors is detectable, and stable and high-accuracy RSSI measurement becomes feasible, with the result that precise zone selection is possible and the interruption of communications is preventable. Add to it that, since the data is extracted at the symbol points in the synchronous condition with the radio signal, it is possible to avoid the problems such as the diversity malfunction and the diversity gain reduction and further to eliminate the disadvantages such as the decrease in the RSSI detection value.

(B1) Description of First Modification of Second Embodiment of this Invention

Figure 15:
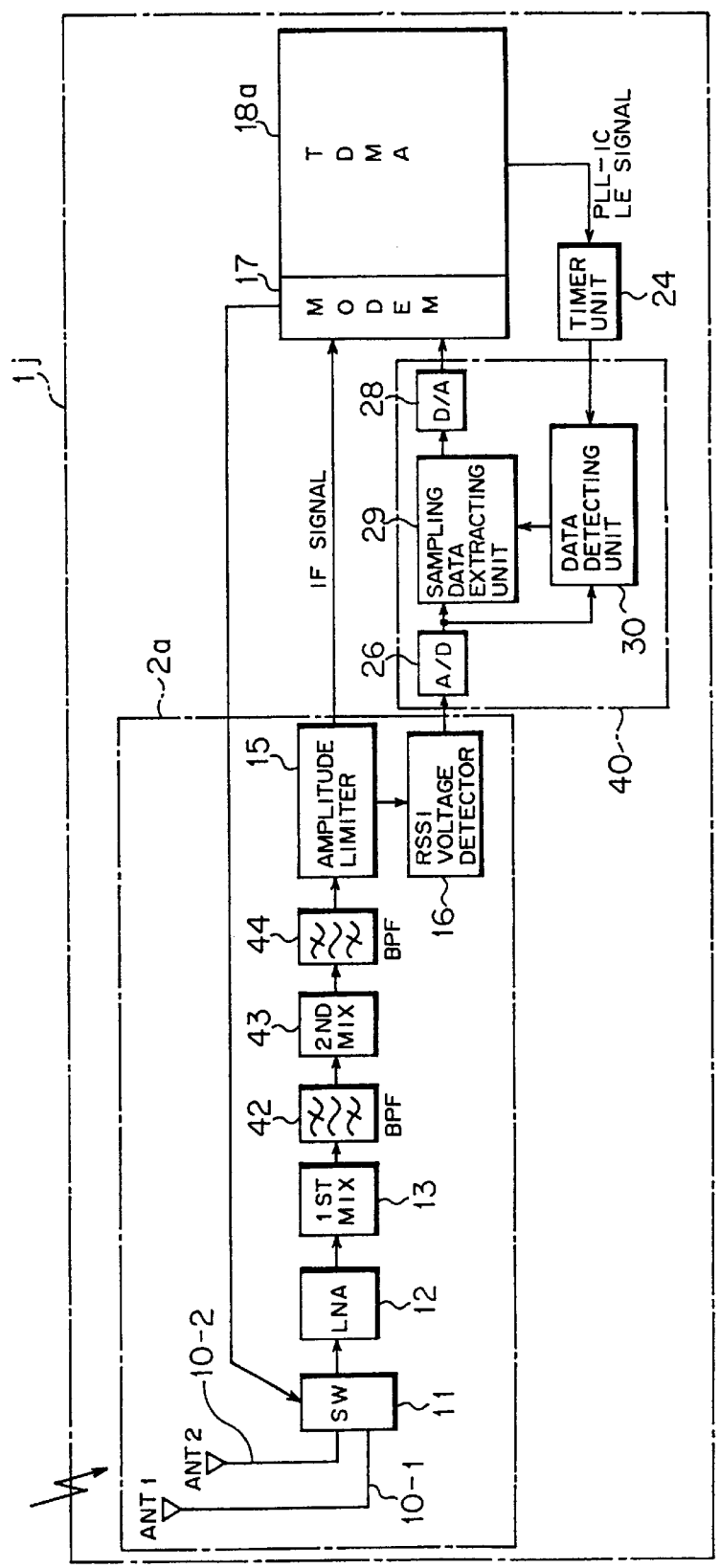
FIG. 15 is a block diagram showing an ambient field level monitor device according to a first modification of the second embodiment of this invention.

FIG. 15 is a block diagram showing an ambient field level monitor device according to a first modification of the second embodiment of this invention. In FIG. 15, the ambient field level monitor device 1$j$ is equipped with a reception unit 2$a$, a modulator/demodulator 17 and an ambient field level monitoring unit 40, and is provided with a TDMA control unit 18$a$ and a timer unit 24.

The TDMA control unit 18a is for monitoring the transmission/reception slot timings and further for making a judgment on the synchronous condition/asynchronous condition on the basis of a demodulated signal from the modulator/demodulator 17, while the timer unit 24 is for outputting a control signal to a data detecting unit 30 for a predetermined period of time from the leading edge (or trailing edge) of an LE signal for a PLL-IC. This predetermined period of time is a value to be measured by the timer unit 24, and is variable through the line design. The time unit 24 outputs a control signal whereby the data detecting unit 30 changes the data detecting interval and way and others. Accordingly, the ambient field level monitor device 1j is designed to switch the digital sampling data extraction interval for a predetermined period of time.

A control signal is made to go to the data detecting unit 30 for a predetermined period of time and to stop after the elapse of the predetermined period of time. Incidentally, the components constituting the reception unit 2a, the modulator/demodulator 17 and the ambient field level monitoring unit 40 are similar to those described above, respectively, and the description thereof will be omitted for brevity.

With this configuration, the data detecting unit 30 always monitors the gradient of the RSSI detection voltage for a predetermined period of time from the leading edge of the LE signal to the PLL-IC to detect a point, at which the ambient field level signal data varies from the increasing condition to the decreasing condition, in the RSSI digital data varying momently, and gives an instruction to the sampling data extracting unit 29 for the extraction of the data at this point. The sampling data extracting unit 29 extracts the data at the points at which the data varies from the increasing condition to the decreasing condition, and the digital/analog converter 28 performs the digital-to-analog conversion of this digital data and supplies the conversion result to the modulator/demodulator 17.

In this way, according to this embodiment, for example, by using a differentiating circuit, a point at which the gradient of the RSSI detection voltage changes from the positive to the negative is detected so that the RSSI detection voltage value at the detected point is determined as the RSSI detection value. Therefore, a high-accuracy RSSI value hardly including errors is detectable in the I slot (asynchronous condition) in which the PLL-IC LE signal is sent, and stable and high-accuracy RSSI measurement becomes feasible, with the result that precise zone selection is possible and the interruption of communications is preventable. Additionally, in the LM slot and the R slot (the synchronous condition), since the data detecting unit 30 triggers the sampling data detecting unit 29 at a data extraction interval whereby the RSSI voltages are detected at the symbol points, it is possible to avoid the problems such as the diversity malfunction and the diversity gain reduction and further to eliminate the disadvantages such as the decrease in the RSSI detection value.

(B2) Description of Second Modification of Second Embodiment of this Invention

Figure 16:
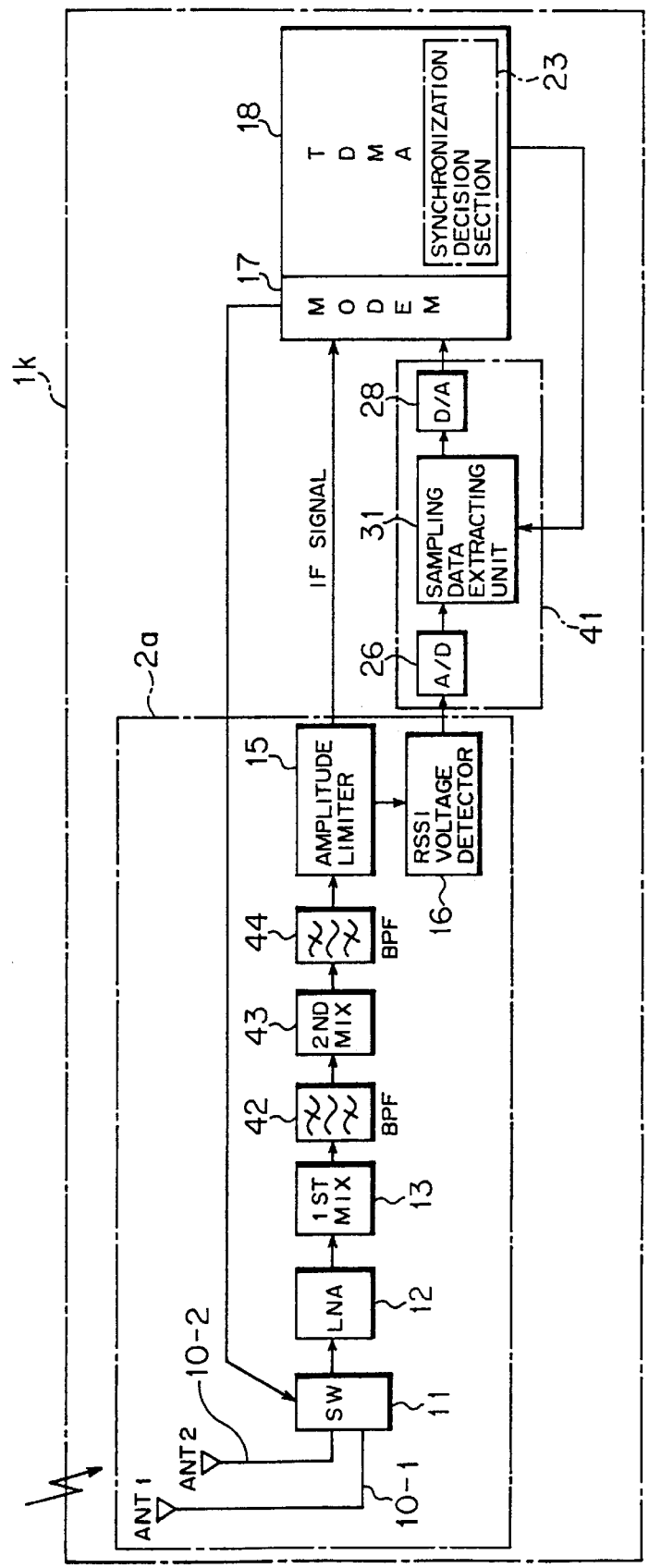
FIG. 16 is a block diagram showing an ambient field level monitor device according to a second modification of the second embodiment of this invention.

FIG. 16 is a block diagram showing an ambient field level monitor device according to a second modification of the second embodiment of this invention. In FIG. 16, the ambient field level monitor device 1k is equipped with a reception unit 2a, a modulator/demodulator 17 and a TDMA control unit 18, and is provided with an ambient field level monitoring unit 41.

The reception unit 2a, the modulator/demodulator 17 and the TDMA control unit 18 are the same as those described above, and will be omitted from the following description.

Furthermore, the ambient field level monitoring unit 41 is for extracting the maximum value of ambient field level signal data, undergoing an analog-to-digital conversion, within one symbol interval (21 kbps) at a high speed (more frequently) when the synchronization decision section 23 makes a decision that the reception unit 2a is out of synchronism with the inputted radio signal. The ambient field level monitoring unit 41 is composed of an analog/digital converter 26, a sampling data extracting unit 31 and a digital/analog converter 28.

The analog/digital converter 26 is for performing an analog/digital conversion of an ambient field level signal being an analog signal from the reception unit 2a, and the sampling data extracting unit 31 is for extracting (sampling) the digital signal from the analog/digital converter 26 at a high speed, and for selecting the maximum value of the extracted data within a predetermined period of time at every given time. Further, the sampling frequency to be used is changed by a control signal from the synchronization decision section 23 so that the extraction in the asynchronous condition is made at a higher speed (shorter interval) than that for the extraction in the synchronous condition. The digital/analog converter 28 is for conducting a digital-to-analog conversion of the digital signal outputted from the sampling data extracting unit 31. Thus, the ambient field level monitoring unit 41 is made to extract digital sampling data from the ambient field level signal at a high speed when the synchronization decision section 23 makes a decision the asynchronous condition with the inputted radio signal.

With this arrangement, for the asynchronous condition, the ambient field level signal outputted from the reception (unit concretely, the RSSI voltage detector 16) is inputted to the ambient field level monitoring unit 41, the analog/digital converter 26 outputs it in the form of digital data. Further, in the sampling data extracting unit 31, the RSSI digital data inputted momently thereto are sampled. In this case, the sampling frequency is increased by the control signal from the synchronization decision section 23 so that the maximum value is selected from the sampled data within each of predetermined time periods, for example, at an interval of 48 μs (21 kHz), to be determined as an RSSI value. Still further, in the digital/analog converter 28, this value is digital-to-analog-converted to be outputted as an RSSI voltage value. Besides, in place of the method of selecting the maximum value, it is also possible to calculate an average value of a plurality of data so that the calculated average value is determined as an RSSI detection value. Moreover, the state of the device 1k varies from the synchronous condition to the asynchronous condition, the sampling frequency is set to a high value for the measurement of an appropriate RSSI value, and when varying from the asynchronous condition to the synchronous condition, it is set to an interval so that the data is extractable at the symbol points.

In this way, according to this embodiment, since is the sampling is made at a high speed for the asynchronous condition, an RSSI value hardly including errors is detectable, and stable and high-accuracy RSSI measurement becomes feasible, with the result that precise zone selection is possible and the interruption of communications is preventable. Further, for the synchronous condition, since the sampling is performed accurately, it is possible to avoid the problems such as the diversity malfunction and the diversity gain reduction and further to eliminate the disadvantages such as the decrease in the RSSI detection value.

(B3) Description of Third Modification of Second Embodiment of this Invention

Figure 17:
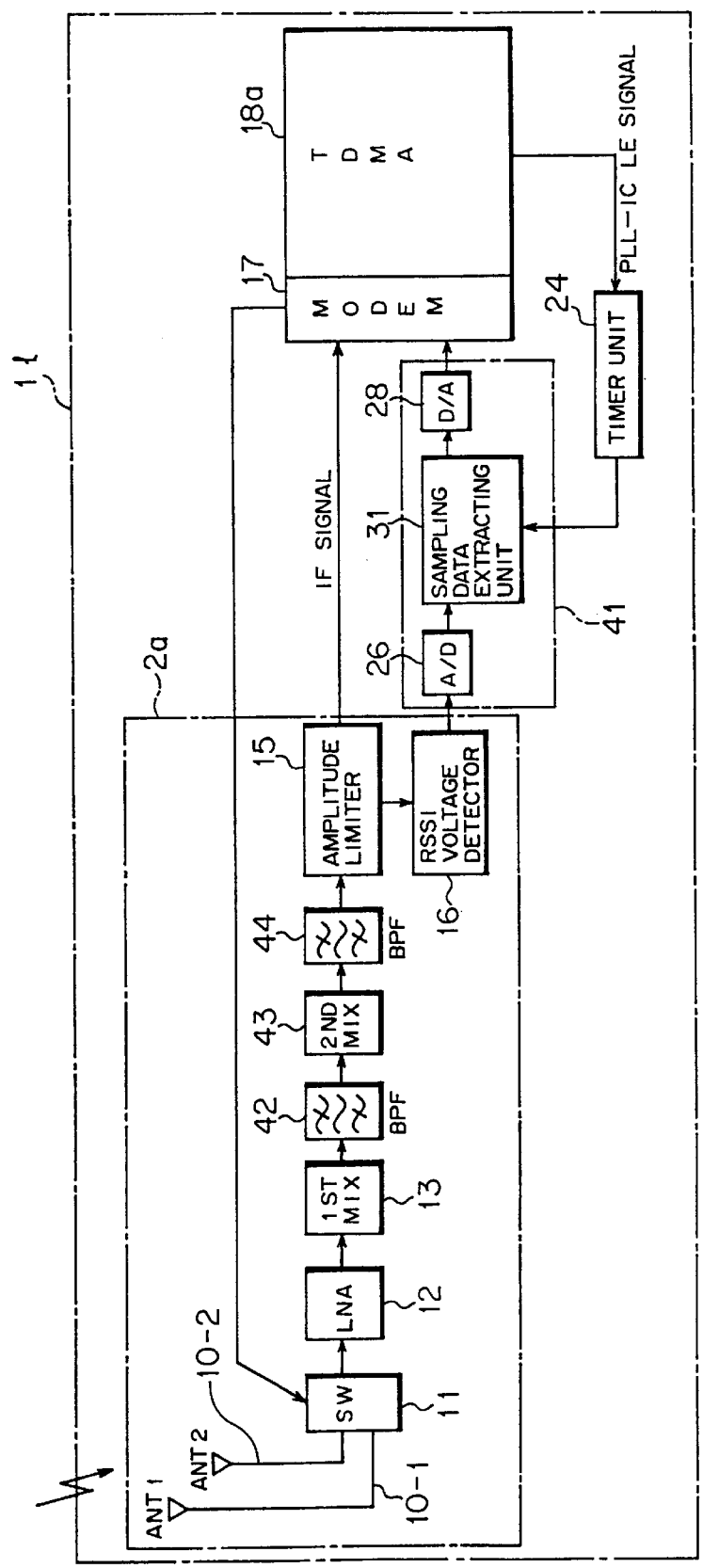
FIG. 17 is a block diagram showing an ambient field level monitor device according to a third modification of the second embodiment of this invention.
Figure 18:
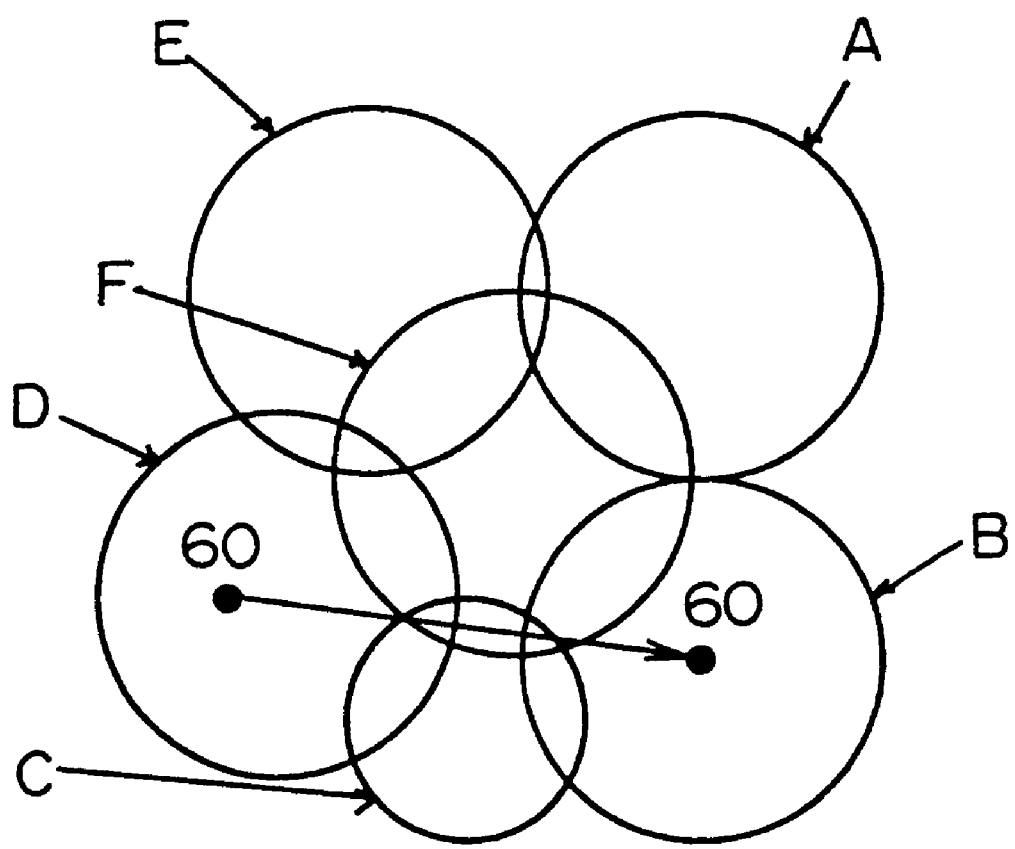
FIG. 18 is an illustration of a cell disposition in a Japanese PDC system.
Figure 19:
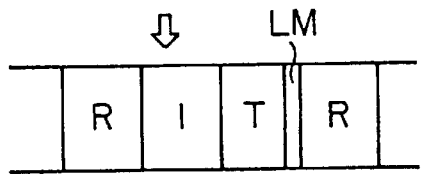
FIG. 19 is an illustration of a TDMA slot configuration on a mobile station side.
Figure 20:
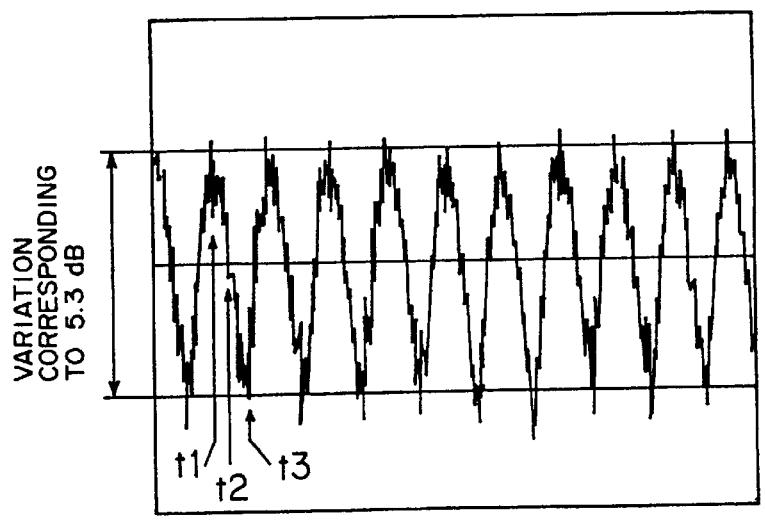
FIG. 20 is an illustration of an RSSI detection voltage waveform appearing at the application of a capacitance value of 100 pF.
Figure 21A:
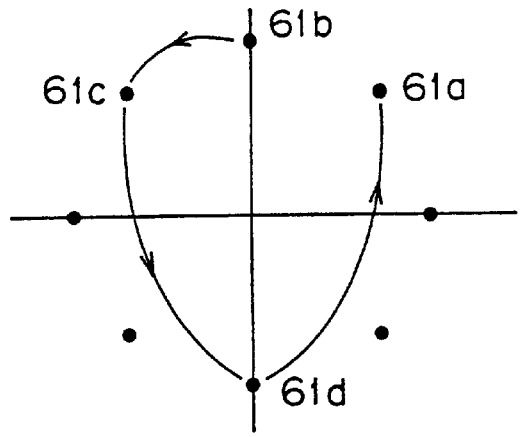
FIG. 21A is an illustration of a disposition of reception signal symbol points on a receive side.
Figure 21B:
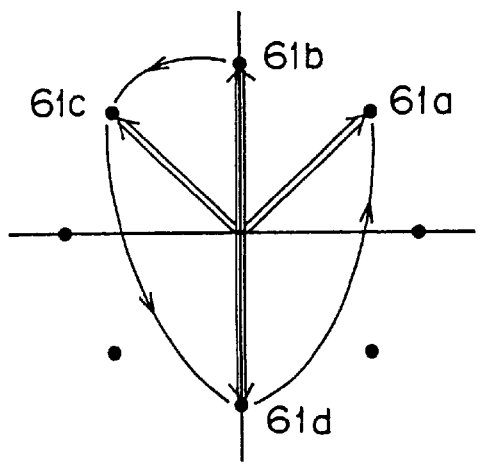
FIG. 21B is an illustration of RSSI amplitude detection values at points in a phase synchronous condition.
Figure 21C:
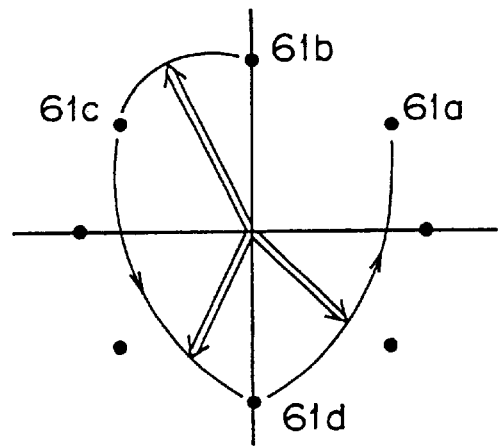
FIG. 21C is an illustration of RSSI amplitude detection values at the points in a phase non-synchronous condition.

FIG. 17 is a block diagram showing an ambient field level monitor device according to a third modification of the second embodiment of this invention. In FIG. 17, the ambient field level monitor device 11 (1 e1) is provided with a timer unit 24 in addition to a reception unit 2a, a modulator/demodulator 17, a TDMA control unit 18a and an ambient field level monitoring unit 41. These are similar in structure to those described before, and the description thereof will be omitted for simplicity.

With this configuration, in the I slot (asynchronous condition) in which a PLL-IC LE signal is forwarded, the time unit 24 sends, to the ambient field level monitoring unit 41, a control signal to heighten the sampling frequency for a give period of time from the PLL-IC LE signal. In the sampling data extracting unit 41, the RSSI digital data coming momently after the analog-to-digital conversion is sampled at a high speed and the highest detection result within a length of time, for example, 48 μs (21 kHz), is selected and determined as an RSSI detection value, and in the digital/analog converter 28, it is digital-to-analog-converted, and outputted as an RSSI voltage value therefrom. Incidentally, this detection method can also be a way of averaging a plurality of data. Accordingly, in the I slot where the PLL-IC LE signal is forwarded, the sampling frequency is heightened for a predetermined period of time to accomplish the measurement of a proper RSSI value, while in the LM slot and the R slot, it is set to an interval so that the data is extractable at symbol points. Thus, the ambient field level monitor device 11 is made to switch the digital sampling data extracting method.

In this way, according to this embodiment, since the sampling is made at a high speed in the I slot (the asynchronous condition) in which the PLL-IC LE signal is forwarded, an RSSI value hardly including errors is detectable, and stable and high-accuracy RSSI measurement becomes feasible, with the result that precise zone selection is possible and the interruption of communications is preventable. Further, in the LM slot and the R slot (synchronous condition), since the sampling is performed accurately, it is possible to avoid the problems such as the diversity malfunction and the diversity gain reduction and further to eliminate the disadvantages such as the decrease in the RSSI detection value.

(C)Others

It should be understood that the present invention is not limited to the above-described embodiments, and that it is intended to cover all changes and modifications of the embodiments of the invention herein which do not constitute departures from the spirit and scope of the invention. For instance, it is also appropriate that the aforesaid analog integrating circuit is constructed using an integrating circuit other than C and R to control the time constant.

What is claimed is:

1. An ambient field level monitor device for a radio mobile terminal, comprising:

a reception section for receiving a radio signal arriving at said radio mobile terminal to output a reception signal originating from the received radio signal and further to output an ambient field level signal;

a synchronization decision section for receiving said reception signal from said reception section to judge whether or not said reception section is in synchronism with the received radio signal; and a time constant variable type ambient field level monitoring section for receiving said ambient field level signal from said reception section, wherein, if said synchronization decision section judges that said reception section is out of synchronism with the received radio signal, said ambient field level monitoring section increases its time constant so that the time constant exceeds its time constant to be taken for when said synchronization decision section judges that said reception section is in synchronism with the received radio signal and if said synchronization decision section judges that the reception section is synchronism with the radio signal, said ambient field level monitoring section decreases the time constant.

2. An ambient field level monitor device for a radio mobile terminal as defined in claim 1, wherein said time constant variable type level monitoring section is constructed by a combination of a capacitor and a resistor, and constructed in the form of an analog integrating circuit in which one of said capacitor and said resistor is made such that its impedance value is variable.

3. An ambient field level monitor device for a radio mobile terminal as defined in claim 1, wherein said time constant variable type ambient field level monitoring section includes:

an analog/digital converter for performing an analog-to-digital conversion of said ambient field level signal forming an analog signal from said reception section;

a digital integrating circuit for integrating a digital signal from said analog/digital converter, said digital integrating circuit being made such that its integrating state is variable; and a digital/analog converter for conducting a digital-to-analog conversion of a digital signal from said digital integrating circuit.

4. An ambient field level monitor device for a radio mobile terminal as defined in claim 1, wherein said ambient field level monitoring section is made to switch at least one of its time constant, a digital sampling data extracting interval and a digital sampling data extracting mode for a predetermined period of time from receiving a channel switching signal through the use of the channel switching signal.

5. A radio mobile terminal having an ambient field level monitor device, comprising:

a reception section for receiving a radio signal arriving at said radio mobile terminal to output a reception signal originating from the received radio signal and further to output an ambient field level signal;

a synchronization decision section for receiving said reception signal from said reception section to judge whether or not said reception section is in synchronism with the received radio signal; and a time constant variable type ambient field level monitoring section for receiving said ambient field level signal from said reception section, wherein, if said synchronization decision section judges that said reception section is out of synchronism with the received radio signal, said ambient field level monitoring section increases its time constant so that the time constant exceeds its time constant to be taken for when said synchronization decision section judges that said reception section is in synchronism with the received radio signal and if said synchronization decision section judges that the reception section is synchronism with the radio signal, said ambient field level monitoring section decreases the time constant.

* * * * *